United States Patent
Kennedy

(10) Patent No.: US 10,469,987 B1
(45) Date of Patent: Nov. 5, 2019

(54) SYSTEM AND METHOD FOR PROVIDING DEVICE SUBJECTIVE VEHICLE PASSIVE FUNCTIONS

(71) Applicant: Honda Motor Co., Ltd., Tokyo (JP)

(72) Inventor: Spencer A. Kennedy, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/214,302

(22) Filed: Dec. 10, 2018

(51) Int. Cl.
| | |
|---|---|
| *H04W 4/021* | (2018.01) |
| *H04W 8/22* | (2009.01) |
| *H04W 4/80* | (2018.01) |
| *H04W 4/40* | (2018.01) |

(52) U.S. Cl.
CPC ............ *H04W 4/022* (2013.01); *H04W 4/40* (2018.02); *H04W 4/80* (2018.02); *H04W 8/22* (2013.01)

(58) Field of Classification Search
CPC ......... H04W 4/022; H04W 4/80; H04W 8/22; H04W 4/40
See application file for complete search history.

(56) References Cited

U.S. PATENT DOCUMENTS

| | | | |
|---|---|---|---|
| 7,236,776 B2* | 6/2007 | Nath | G08B 21/06 455/41.2 |
| 8,744,482 B2 | 6/2014 | Margalef et al. | |
| 8,805,374 B2 | 8/2014 | Zhu et al. | |
| 8,836,477 B2 | 9/2014 | Hiramine | |
| 8,847,754 B2 | 9/2014 | Buchheim et al. | |
| 9,008,695 B2 | 4/2015 | Do et al. | |
| 9,008,917 B2 | 4/2015 | Gautama et al. | |
| 9,079,560 B2 | 7/2015 | Gautama et al. | |
| 9,086,879 B2 | 7/2015 | Gautama et al. | |
| 9,126,545 B2 | 9/2015 | Ampunan et al. | |
| 9,179,343 B2 | 11/2015 | Yang et al. | |
| 9,241,235 B2 | 1/2016 | Santavicca | |
| 9,244,152 B1 | 1/2016 | Thiagarajan | |
| 9,253,674 B2 | 2/2016 | Rosener | |
| 9,432,815 B2 | 8/2016 | Edge | |
| 9,443,275 B1 | 9/2016 | O'Gwynn | |
| 9,483,887 B1 | 11/2016 | Soleimani | |
| 9,594,150 B2 | 3/2017 | Thiagarajan | |
| 9,666,005 B2 | 5/2017 | Ellis et al. | |
| 9,860,692 B2 | 1/2018 | Pandey et al. | |
| 9,928,673 B2 | 3/2018 | Berezin et al. | |
| 9,963,108 B2 | 5/2018 | Nishidai et al. | |
| 2004/0201277 A1 | 10/2004 | Hentsch et al. | |
| 2011/0183601 A1* | 7/2011 | Hannon | B60K 35/00 455/1 |

(Continued)

*Primary Examiner* — Lewis G West
(74) *Attorney, Agent, or Firm* — Rankin, Hill & Clark LLP

(57) ABSTRACT

A system and method for providing for providing device subjective vehicle passive functions that include determining a type of portable device that is connected to a vehicle. The system and method also include determining at least one positional threshold value pertaining to the type of portable device. The system and method additionally include determining if the portable device is located within the at least one passive function zone of the vehicle based on evaluating at least one positional threshold value pertaining to the type of portable device. The system and method further include controlling at least one vehicle system to enable at least one passive function based on determining that the portable device is located within the at one passive function zone.

20 Claims, 7 Drawing Sheets

(56) References Cited

U.S. PATENT DOCUMENTS

| | | | |
|---|---|---|---|
| 2012/0244877 A1* | 9/2012 | Margalef | G01S 5/0252 |
| | | | 455/456.1 |
| 2013/0226413 A1* | 8/2013 | Cuddihy | B60N 2/002 |
| | | | 701/45 |
| 2014/0309813 A1* | 10/2014 | Ricci | B60Q 1/00 |
| | | | 701/2 |
| 2015/0126171 A1* | 5/2015 | Miller | H04L 67/125 |
| | | | 455/418 |
| 2016/0088086 A1* | 3/2016 | Cuddihy | H04L 67/12 |
| | | | 455/41.2 |
| 2016/0133072 A1 | 5/2016 | Santavicca | |
| 2016/0261425 A1* | 9/2016 | Horton | G05B 15/02 |
| 2017/0013482 A1 | 1/2017 | Tandai | |
| 2017/0067982 A1 | 3/2017 | Pan et al. | |
| 2017/0186257 A1 | 6/2017 | Gerlach | |
| 2017/0253216 A1 | 9/2017 | Nishidai et al. | |
| 2017/0345241 A1 | 11/2017 | Santavicca | |
| 2018/0099643 A1* | 4/2018 | Golsch | B60R 25/24 |
| 2018/0134254 A1 | 5/2018 | Penilla et al. | |
| 2018/0359358 A1* | 12/2018 | Alghoniem | H04W 4/40 |

* cited by examiner

US 10,469,987 B1

SYSTEM AND METHOD FOR PROVIDING DEVICE SUBJECTIVE VEHICLE PASSIVE FUNCTIONS

BACKGROUND

Many current passive entry systems for vehicles are based on a LF/RF communications. These include controlled systems where LF sending and receiving antennas are of the same configuration. Accordingly, LF signal strength reception is kept under control with minimal variance. However, with the advent of more consumer electronic RF technology that may use RF communications and constant updating of various makes, models, versions of consumer electronic RF technology there may be greater variance in transmission/reception power/speed that could have impact on efficiently and consistently providing passive entry functions. Accordingly, different types of consumer electronic RF technology that may include different types of hardware may perform in an inconsistent manner. Such inconsistent performance may result in incorrect/delayed positional detection of different types of consumer electronic RF technology with respect to a vehicle which may delay or prohibit proper passive entry functionality.

BRIEF DESCRIPTION

According to one aspect, a computer-implemented method for providing device subjective vehicle passive functions that includes determining a type of portable device that is connected to a vehicle. The computer-implemented method also includes determining at least one positional threshold value pertaining to the type of portable device. The at least one positional threshold value is associated with at least one passive function zone of the vehicle. The computer-implemented method additionally includes determining if the portable device is located within the at least one passive function zone of the vehicle based on evaluating at least one positional threshold value pertaining to the type of portable device. The computer-implemented method further includes controlling at least one vehicle system to enable at least one passive function based on determining that the portable device is located within the at one passive function zone.

According to another aspect, a system for providing device subjective vehicle passive functions that includes a memory storing instructions when executed by a processor cause the processor to determine a type of portable device that is connected to a vehicle. The instructions also cause the processor to determine at least one positional threshold value pertaining to the type of portable device. The at least one positional threshold value is associated with at least one passive function zone of the vehicle. The instructions additionally cause the processor to determine if the portable device is located within the at least one passive function zone of the vehicle based on evaluating at least one positional threshold value pertaining to the type of portable device. The instructions further cause the processor to control at least one vehicle system to enable at least one passive function based on determining that the portable device is located within the at one passive function zone.

According to a further aspect, non-transitory computer readable storage medium storing instructions that when executed by a computer, which includes a processor perform a method. The method includes determining a type of portable device that is connected to a vehicle. The method also includes determining at least one positional threshold value pertaining to the type of portable device. The at least one positional threshold value is associated with at least one passive function zone of the vehicle. The method additionally includes determining if the portable device is located within the at least one passive function zone of the vehicle based on evaluating at least one positional threshold value pertaining to the type of portable device. The method further includes controlling at least one vehicle system to enable at least one passive function based on determining that the portable device is located within the at one passive function zone.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
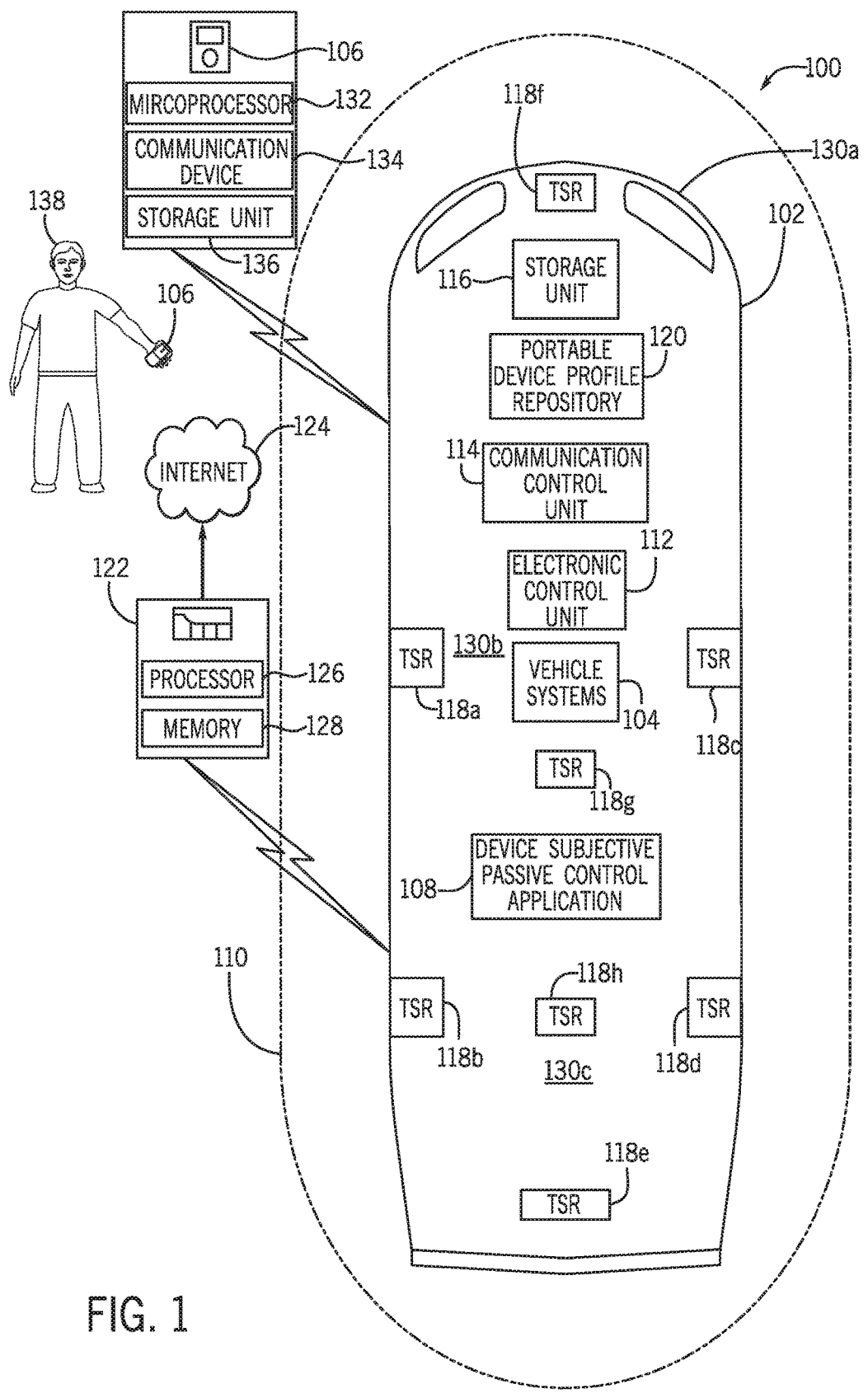
FIG. 1 is a schematic view of an exemplary operating environment of a vehicle passive functionality system within a vehicle for providing device subjective vehicle passive functions associated with one or more vehicle systems according to an exemplary embodiment.

The following includes definitions of selected terms employed herein. The definitions include various examples and/or forms of components that fall within the scope of a term and that can be used for implementation. The examples are not intended to be limiting.

A "bus,' as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Media Oriented System Transport (MOST), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), a Bluetooth® communication system, a radio frequency communication system (e.g., LF radio frequency), an Ethernet system (e.g., IEEE 802.3), a token ring system (e.g., IEEE 802.5), an ultra-wideband (UWB), a local area network (LAN), a wide area network (WAN), a point-to-point system, a circuit switching system, a packet switching system, among others.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device" as used herein can include devices that can derive from vehicle components, systems, subsystems, and electronic devices. The term "output devices" includes, but is not limited to: display devices, and other devices for outputting information and functions.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 shows a schematic view of an exemplary operating environment of a vehicle passive functionality system 100 within a vehicle 102 (e.g., non-autonomous vehicle, semi-autonomous vehicle, fully-autonomous vehicle) for providing device subjective vehicle passive functions (e.g., passive entry/exit functions) associated with one or more vehicle systems 104 according to an exemplary embodiment. The device subjective passive functions may be subjectively provided based on a subjective location of one or more specific types of portable devices 106.

The one or more specific types of portable devices 106 may include portable devices 106 of one or more makes (i.e., manufacturers of the portable devices 106), models (i.e., models released by the manufacturers of the portable devices 106), versions (i.e., hardware versions, operating system versions, software versions) and/or that include one or more hardware chipset versions (i.e., make(s), model(s), and version(s) of chipset electronic components, RF antenna version(s)). The components of the system 100, as well as the components of other systems, hardware architectures and software architectures discussed herein, may be combined, omitted or organized into different architecture for various embodiments. However, the exemplary embodiments discussed herein focus on the environment as illustrated in FIG. 1, with corresponding system components, and related methods.

In an exemplary embodiment, the system 100 includes a device subjective passive control application (passive control application) 108. The passive control application 108 may be executed by the vehicle 102 and/or one or more portable devices 106 to determine when one or more specific types of portable devices 106 are located within a predetermined passive function zone 110. The predetermined passive function zone 110 may be located within a predetermined proximity of the vehicle 102 and may be associated with one or more predetermined passive entry/exit functions of one or more vehicle systems 104 of the vehicle 102.

The passive control application 108 may also be executed to determine when the one or more specific types of portable devices 106 are located within one or more customized passive function zones (exemplary customized passive function zones shown in FIG. 5) that may be created based on user inputs. In particular, the one or more customized passive function zones may be associated with one or more user customized passive entry/exit functions of one or more vehicle systems 104 of the vehicle 102 based on input(s) provided by a user 138 of the passive control application 108. The user 138 of the passive control application 108 may include, but may not be limited to, an individual who utilizes the passive control application 108, an individual who holds/carries the portable device(s) 108, an owner/operator of the portable device(s) 108, an owner of the vehicle 102, a customary driver of the vehicle 102, a non-customary driver of the vehicle 102, an individual who is utilizing a vehicle rental/leasing service as a driver/occupant of the vehicle 102, an individual who is utilizing a ride sharing service as a driver/occupant of the vehicle 102, an individual who is a driver/occupant of the vehicle 102 configured as a semi-autonomous and/or autonomous vehicle 102, and the like.

As discussed below, the passive control application 108 may be configured to determine one or more positional threshold values that may include one or more subjective positional threshold values. The one or more subjective positional threshold values may pertain to the predetermined passive function zone 110 for each specific type (make, model, version, and/or hardware chipset version) of the portable device(s) 106 that wirelessly connects to the vehicle 102. Stated differently, the one or more subjective positional threshold values may include threshold values that subjectively apply to one or more makes, models, versions, and/or hardware chipset versions (e.g., processor versions, circuit versions, RF antenna versions) of one or more (specific) portable devices 106 to account for transmission/reception power, processing power, and/or hardware variance that may be prevalent between various makes, models, versions and/or hardware chipset versions of various portable devices 106.

In one or more embodiments, the one or more subjective positional threshold values may include, but may not be limited to received signal strength indication (RSSI) values, angle of arrival (AOA) values, and/or time of flight (TOF) values that may be created by the application 108 and further utilized by the application 108 to determine the presence of one or more respective portable devices 106 within the predetermined passive function zone 110 based on one or more RF response signals received from the portable device(s) 106.

As discussed below, in one embodiment, the passive control application 108 may primarily determine one or more predetermined positional threshold values that apply to the predetermined passive function zone 110. Upon analysis of the make, model, version, and/or the hardware chipset version of the portable device(s) 106, the application 108 may be configured to shift (e.g., modify) the predetermined positional threshold values that are associated to one or more transceivers 118a-118h (e.g., receivers and/or transmitters) of the vehicle 102 to the subjective positional threshold values that subjectively pertain to one or more specific makes, models, versions, and/or hardware chipset versions of portable devices 106.

As represented in FIG. 1, the predetermined passive function zone 110 may include locations that are included within a predetermined area around the vehicle 102 that may be utilized to initiate one or more predetermined passive functions by one or more of the vehicle systems 104 of the vehicle 102. It is to be appreciated that the application 108 may provide the predetermined passive function zone 110 as sized differently than represented in the exemplary embodiment of FIG. 1.

For purposes of simplicity, this disclosure includes a single predetermined passive function zone 110 as provided by the application 108 and which is associated with one or more subjective positional threshold values as created by the application 108 for one or more specific makes, models, versions, and/or hardware chipset versions of portable devices 106. However, it is also appreciated that the application 108 may provide more than one predetermined passive function zone of various sizes that may be included at one or more locations around the vehicle 102. Accordingly, the application 108 may determine one or more subjective positional threshold values that subjectively pertain to each of a plurality of predetermined passive function zones and/or a differently sized predetermined passive function zone than the zone 110 represented in FIG. 1.

As an illustrative example, the application 108 may provide two predetermined passive function zones of various sizes that may include a predetermined wide passive function zone and a predetermined local passive function zone. The zones may each be respectively utilized to enable respective functions of one or more respective vehicle systems 104 based on the determination that the portable device(s) 106 has entered or exited the respective zones based on an evaluation of respective predetermined passive threshold values that respectively pertain to each of the zones and are specifically created for specific types of portable device(s) 106. In other words, each of the two predetermined passive function zones may be associated to respective subjective positional threshold values that are created by the application 108 to be subjectively utilized for one or more specific makes, models, versions and/or hardware chipset versions of one or more portable devices 106 that wirelessly communicate with the vehicle 102.

In one embodiment, upon determining that a specific type of portable device 106 has entered or exited the predetermined passive function zone 110 based on the analysis of the one or more subjective positional threshold values, as discussed below, the passive control application 108 may communicate with an electronic control unit (ECU) 112 of the vehicle 102 to operably control one or more of the vehicle systems 104 to enable particular passive functions. In alternate embodiments, the passive control application 108 may communicate with an electronic control unit (ECU) 112 of the vehicle 102 to operably control one or more of the vehicle systems 104 to disable particular passive functions.

The one or more passive functions that may be associated with the predetermined passive function zone 110 may include, but may not be limited to passive entry/exit functions such as approach unlocking of vehicle doors, walk-away locking of vehicle doors, welcome lighting, enablement of user related settings, disablement of user related settings, and the like. The one or more passive functions pertaining to user related settings may include, but may not be limited to, audio system options, navigation system options, seat positioning options, mirror positioning options, lighting options, climate control (HVAC) options, audio alerts, visual alerts, etc., based on the user's preferences. It is to be appreciated that the one or more vehicle systems 104 may be controlled to enable and/or disable numerous contemplated passive entry/exit functions in addition to the exemplary functions described herein.

In an exemplary embodiment, the passive control application 108 may additionally allow the user 138 of the application 108 (e.g., user 138 who holds a portable device (s) 106 of a particular type) to create instructions to execute one or more customizable passive functions based on the portable device 106 entering or exiting one or more customized passive function zones that are also created by the user 138. The one or more customized passive function zones may be respectively associated with one or more customized passive functions that may be executed by one or more respective vehicle systems 104.

As discussed below, the one or more customizable passive functions may be customized in addition to the one or more passive function zones by the user 138. In one or more embodiments, the one or more customizable passive functions zones may include, but may not be limited to, customizable vehicle lighting, customizable approach automated opening of vehicle doors, customizable walk-away automated closing of vehicle doors, customizable security system enablement, customizable security system disablement, customizable vehicle enablement, customizable vehicle disablement, customizable enablement of user related settings, customizable disablement of user related settings and the like. The customizable user related settings may include, but may not be limited to, customizable audio system options, customizable navigation system options, customizable seat positioning options, customizable mirror positioning options, customizable lighting options, customizable climate control (HVAC) options, customizable audio alerts, customizable visual alerts, etc. It is to be appreciated that the one or more vehicle systems 104 may be controlled to enable or disable numerous contemplated customized passive functions in addition to the exemplary functions described herein.

As discussed in more detail below, upon creating the one or more customized passive function zones that are respectively associated with one or more particular passive functions, the passive control application 108 may determine one or more customized positional threshold values that are specifically associated with the one or more customized passive function zones created by the user 138. In particular, the one or more customized positional threshold values may be determined based on the analysis of one or more subjective positional threshold values that are associated to one or more transceivers 118a-118h of the vehicle 102 and that may specifically pertain to particular makes, models, version, and/or hardware chipset versions of the portable device(s) 106.

As discussed below, in one embodiment, upon receiving one or more inputs by the user 138 to create one or more customized passive function zones to enable and/or disable one or more passive functions, the passive control application 108 may determine one or more customized positional threshold values that are associated with one or more of the transceivers 118a-118h of the vehicle 102. In one embodiment, the passive control application 108 may create the one or more customized passive function zones by modifying the one or more subjective positional threshold values to thereby account for one or more makes, models, versions, and/or hardware chipset versions of the portable device(s) 106.

Accordingly, the application 108 may ensure that the one or more positional threshold values associated with respective passive function zones are subjectively applied to accommodate varying RF transmission/reception performance between various makes, models, versions, and/or hardware chipset versions of various portable devices 106. In other words, the passive control application 108 may efficiently determine when the portable device 106 (e.g., user 138 carrying the portable device 106) enters or exits the predetermined passive function zone 110 and/or one or more customized passive function zones as the user 138 holding the portable device 106 arrives (e.g., walks) towards the vehicle 102 or departs away from the vehicle 102.

The passive control application 108 may thereby determine dynamic positional threshold values that may be shifted/modified based on specific types of portable devices 106 that wirelessly communicate with the vehicle 102. This functionality may minimize the effect of any potential variance of power/speed on transmission and/or reception of wireless communication signals between differing types of portable devices 106 (e.g., based on differing RF antennas) and the vehicle 102. The application 108 may also provide such positional threshold values to account for new makes, models, and/or versions of portable devices 106 (e.g., that are new to the market) and/or new hardware chipset versions that may be utilized within one or more types of portable devices 106.

With particular reference to the vehicle 102, in one embodiment, the ECU 112 may operably control the vehicle 102, the vehicle systems 104 of the vehicle 102, and the components of the vehicle 102 that may include, but are not limited to the components shown in FIG. 1. The ECU 112 may include a microprocessor, one or more application-specific integrated circuit(s) (ASICs), or other similar devices. The ECU 112 may also include internal processing memory, an interface circuit, and bus lines for transferring data, sending commands, and communicating with the systems and components of the vehicle 102.

The ECU 112 may also include a separate communications device (not shown) for sending data internally in the vehicle 102. In one embodiment, the ECU 112 may operably communicate with a head unit (not shown) of the vehicle 102 that may include a display unit (not shown). The ECU 112 and/or the head unit may send one or more command signals to one or more of the vehicle systems 104 to enable or disable one or more functions of the vehicle system(s) 104. Such functions may include one or more passive functions that may be enabled or disabled based on the position of the portable device(s) 106 with respect to the predetermined passive function zone 110 and/or one or more customized passive function zones.

In one or more embodiments, the ECU 112 may also be operably connected to a communication control unit 114, a storage unit 116, and the transceivers 118a-118h of the vehicle 102. The communication control unit 114 of the vehicle 102 may be operably connected to the transceivers 118a-118h. It is appreciated that the communication control unit 114 may be operably connected to one or more additional transceivers of the vehicle 102 that may not be shown in FIG.

The communication control unit 114 may be included as part of or operably connected to a telematics control unit and may utilize the transceivers 118a-118h to send and receive communication signals to and from one or more portable devices 106 and the vehicle 102. Such signals may include, but may not be limited to, RF signals that may include Bluetooth® signals, Wi-Fi signals, ZigBee signals, Wi-Max signals, and the like that may be communicated between the vehicle 102 and one or more portable devices 106. In some embodiments, such signals may also include low frequency (LF) polling signals and LF response signals that may be communicated between one or more portable devices 108 (e.g., key fobs) associated with the vehicle 102.

In an exemplary embodiment, the transceivers 118a-118h may be capable of providing wireless computer communications utilizing various protocols to be used to send/receive electronic signals internally to components and systems within the vehicle 102 and to external devices including the portable device(s) 106. The transceivers 118a-118h may include respective transmitter antennas (not shown) and receiver antennas (not shown) that may be separate components or may be configured as a single component.

The transceivers 118a-118h may be included at one or more areas of the vehicle 102 that may each be utilized to determine a location of the portable device(s) 106 within the predetermined proximity of the vehicle 102. For example, as shown in FIG. 1, the transceivers 118a-118h may be provided within a vicinity of a front portion 130a (e.g., hood) of the vehicle 102, at a middle portion 130b of the vehicle 102, and at a rear portion 130c (e.g., trunk) of the vehicle 102 to send and receive signals from various areas around the vehicle 102.

In one embodiment, the communication control unit 114 may be configured to control operation of one or more of the transceivers 118a-118h to send one or more RF communication signals to the portable device(s) 106 in the form of one or more RF polling signals. Additionally, the communication control unit 114 may be configured to control operation of one or more of the transceivers 118a-118h to receive one or more RF response signals from one or more portable devices 106 that are transmitted to the vehicle 102 based on the receipt of the RF polling signals by the portable device(s) 106.

As discussed below, the one or more RF response signals may be electronically analyzed by the communication control unit 114 to determine device identification information and device configuration data associated with each respective portable device 106 that connects to and/or communicates with the communication control unit 114 of the vehicle 102. In particular, the one or more RF response signals may also be analyzed to determine the presence of the portable device(s) 106 with respect to the predetermined passive function zone 110 that is defined by one or more predetermined positional threshold values that are associated with each of the transceivers 118a-118h. Accordingly, the passive control application 108 may create one or more subjective positional threshold values that specifically pertain to each of the make, model, version, and/or hardware chipset version of the portable device(s) 106 and that are respectively associated with each of the transceivers 118a-118h. Stated differently, each of the transceivers 118a-118h may be associated with one or more respective predetermined subjective positional threshold values and one or more subjective positional threshold values that are created by the application 108 based on shifting of the respective predetermined subjective positional threshold values.

The passive control application 108 may also create the one or more customized threshold values to subjectively apply to the make, model, version, and/or the hardware chipset version of the portable device(s) 106. Accordingly, upon the receipt of one or more RF response signals by one or more of the transceivers 118a-118h, the one or more RF response signals may also be analyzed to determine the presence of the portable device(s) 106 with respect to one or more of the customized passive function zones that are associated with and defined by one or more customized positional threshold values.

In one configuration, the communication control unit 114 may be configured to evaluate the one or more RF response signals to determine respective RSSI values that are associated with the signal strength of the one or more RF response signals received by one or more of the transceivers 118a-118h as sent by the portable device(s) 106. As discussed below, the passive control application 108 may determine the one or more subjective positional threshold values and/or the one or more customized positional threshold values as RSSI threshold values (e.g., dBm values) that may be associated with each of the transceivers 118a-118h and that may specifically pertain to a particular make, model, version, and/or hardware chipset version of the portable device 106.

The passive control application 108 may thereby compare a positional value of each RF signal as an RSSI value that is associated with the signal strength of each RF response signal received by one or more of the transceivers 118a-118h against the RSSI subjective positional threshold value(s) and the RSSI customized positional threshold value(s) associated to the one or more respective transceivers 118a-118h to determine if the portable device(s) 106 is within or outside of the predetermined passive function zone 110 and/or one or more of the customized passive function zones. As discussed below, if the application 108 determines that the RSSI value meets at least one RSSI subjective positional threshold value and/or at least one RSSI customized positional threshold value, the application 108 may communicate with the ECU 112 to control one or more vehicle systems 104 to enable and/or disable one or more respective passive functions.

As discussed below, the passive control application 108 may additionally or alternatively determine the one or more subjective positional threshold values and/or the one or more customized positional threshold values as AOA threshold values (e.g., degree values) that may be associated with each of the transceivers 118a-118h and that may specifically pertain to a particular make, model, version, and/or hardware chipset version of the portable device 106.

The passive control application 108 may thereby compare a positional value of each RF signal as an AOA value that is associated with the angle of arrival of each RF response signal received by one or more of the transceivers 118a-118h against the AOA subjective positional threshold value(s) and AOA customized positional threshold value(s) associated to the one or more respective transceivers 118a-118h to determine if the portable device(s) 106 is within or outside of the predetermined passive function zone 110 and/or one or more of the customized passive function zones. As discussed below, if the application 108 determines that the AOA value meets at least one AOA subjective positional threshold value and/or at least one AOA customized positional threshold value, the application 108 may communicate with the ECU 112 to control one or more vehicle systems 104 to enable and/or disable one or more respective passive functions.

The passive control application 108 may additionally or alternatively determine the one or more subjective positional threshold values and/or the one or more customized positional threshold values as TOF threshold values (e.g., time based values) that may be associated with each of the transceivers 118a-118h and that may specifically pertain to a particular make, model, version, and/or hardware chipset version of the portable device 106.

The passive control application 108 may thereby compare a positional value of each RF signal as a TOF value that is associated with the time of flight of each RF response signal received by one or more of the transceivers 118a-118h against the TOF subjective positional threshold value(s) and TOF customized positional threshold value(s) associated to the one or more respective transceivers 118a-118h to determine if the portable device(s) 106 is within or outside of the predetermined passive function zone 110 and/or one or more of the customized passive function zones. As discussed below, if the application 108 determines that the TOF value meets at least one subjective positional threshold value and/or at least one customized positional threshold value, the application 108 may communicate with the ECU 112 to control one or more vehicle systems 104 to enable and/or disable one or more respective passive functions.

In some embodiments, the passive control application 108 may be configured to compare any combination of RSSI values, AOA values, and/or TOF values against one or more respective RSSI threshold values, one or more AOA threshold values, and/or one or more TOF threshold values. The combination of RSSI values, AOA values, and/or TOF values may be utilized to determine if the portable device(s) 106 is within or outside the predetermined passive function zone 110 and/or one or more of the customized passive function zones. For example, the passive control application 108 may compare an AOA value of an RF response signal with an AOA subjective positional threshold value(s) and AOA customized positional threshold value(s). The passive control application 108 may also compare a TOF value of the RF response signal with a TOF subjective threshold value(s) and a TOF customized positional threshold value(s). Based on the aforementioned AOA and TOF comparisons, the application 108 may determine if the portable device(s) 106 is within or outside of the predetermined passive function zone 110 and/or one or more of the customized passive function zones.

With continued reference to FIG. 1, the storage unit 116 of the vehicle 102 may include various memories such as, for example L1, L2, or L3 cache or system memory. As such, the memory may include static random access memory (SRAM), dynamic RAM (DRAM), flash memory, read only memory (ROM), or other similar memory devices. The storage unit 116 may be utilized to store one or more operating systems, applications, associated operating system data, application data, vehicle system and subsystem user interface data, and the like that may be executed by the ECU 112.

In an exemplary embodiment, the storage unit 116 may include a portable device profile repository 120. The portable device profile repository 120 may be configured as a storage data repository that may store one or more portable device profiles (e.g., data files) that may each be respectively associated with one or more portable devices 106 that may be wirelessly connected to the vehicle 102. In particular, the passive control application 108 may create a respective portable device profile that is stored within the portable device profile repository 120 when a particular portable device 106 is paired with the vehicle 102 and/or connected for wireless data communication with the vehicle 102. For example, upon a Bluetooth® connection between a particular portable device 106 used by the user 138 and the communication control unit 114 of the vehicle 102, the application 108 may create a respective portable device profile that is associated with the particular portable device 106.

In an alternate embodiment, the application 108 may create a respective portable device profile that is associated with the portable device(s) 106 based on portable device related data that may be communicated from an externally hosted server infrastructure (external server) 122. Such portable device related data may include a make, model, version, and/or hardware chipset version of the portable device(s) 108. Such portable device related data may additionally include a device identification (e.g., alpha-numeric code) that may be specifically associated with the portable device(s) 106 and may utilized to determine the make, model, version, and/or hardware chipset version of the portable device(s) 108.

In one embodiment, each portable device profile created by the application 108 and stored within the portable device profile repository 120 of the storage unit 116 may include a data field that may be populated with the device identification that may be specifically associated with each particular portable device 106. Additionally, each portable device profile may include one or more data fields that may be populated with device configuration data that may include the make, model, version, and hardware chipset version information associated with the respective portable device 106. As discussed below, the device configuration data may be determined based on data stored on the respective portable device 106 and/or on the portable device related data communicated by the external server 122.

As discussed below, such information may be utilized by the application 108 to shift one or more predetermined positional threshold values that pertain to the predetermined passive function zone 110 and are respectively associated to one or more transceivers 118a-118h. The passive control application 108 may accordingly shift the one or more predetermined positional threshold values that are associated to each of the one or more of the transceivers 118a-118h of the vehicle 102. The one or more subjective positional threshold values may include RSSI subjective positional threshold values, AOA subjective positional threshold values, and/or TOF subjective positional threshold values that specifically pertain to the respective make, model, version and/or hardware chipset version of the portable device 106 associated with the respective portable device profile. The passive control application 108 may thereby populate one or more fields of the portable device profile with the one or more subjective positional threshold values to be further analyzed by the application 108 to determine if the respective portable device 106 is located within the predetermined passive function zone 110.

In one embodiment, each portable device profile may additionally include one or more fields that pertain to one or more customized positional threshold values. The one or more customized positional threshold values may include RSSI customized positional threshold values, AOA customized positional threshold values, and/or TOF customized positional threshold values that each respectively may pertain to one or more customized passive function zones and may be associated with each of the transceivers 118a-118h of the vehicle 102.

As discussed above, the TOF customized positional threshold values may specifically pertain to the respective make, model, version, and/or hardware chipset version of each portable device 106 that wirelessly communicates with the vehicle 102. The passive control application 108 may thereby populate the field(s) of the portable device profile associated with each respective portable device 106 with the one or more customized positional threshold values to be further analyzed by the application 108 to determine if the respective portable device 106 is located within one or more of the customized passive function zones.

With continued reference to FIG. 1, in an exemplary embodiment, the externally hosted server infrastructure 122 may include one or more servers (server(s) not individually shown) that may be hosted and/or accessed by one or more manufactures of portable devices 106, one or more portable device vendors, one or more vehicle manufactures, one or more third-party entities (e.g., portable device chipset manufactures), and/or the user 138 through an interface of the application 108. The one or more servers of the externally hosted server infrastructure 122 may include, but may not be limited to, data servers, web servers, application servers, collaboration servers, proxy servers, virtual servers, and the like.

In one embodiment, each of the servers of the externally hosted server infrastructure 122 may include a respective processor 126 that may operably control a plurality of components of the respective server. The processor 126 may include a communication unit (not shown) that may be configured to connect to an internet cloud 124 to enable communications between the respective server of the externally hosted server infrastructure 122, the vehicle 102, and one or more portable devices 106.

In one embodiment, the processor 126 of each respective server of the externally hosted server infrastructure 122 may be operably connected to a memory 128. The memory 128 may store one or more operating systems, applications, associated operating system data, application data, executable data, and the like. In particular the memory 128 may be configured to store portable device specification data that may be populated by the one or more manufactures of various portable devices, one or more portable device vendors, one or more vehicle manufactures, one or more third-parties, and/or the user 138 through an interface of the application 108. The portable device specification data may include technical specifications relating to the manufacturer, model, the version, and/or the hardware chipset of each portable device 106.

In one embodiment, one or more manufactures of one or more portable devices 106, one or more portable device vendors, one or more vehicle manufactures, one or more third-parties, and/or the user 138 may populate the portable device specification data upon the manufacture and/or release of a particular make, model, version, and/or hardware chipset of a portable device(s) 106. In one embodiment, portable device specification data may be evaluated by the passive control application 108 to create the one or more subjective positional threshold values and/or the one or more customized positional threshold values that may be created to pertain to the make, model, version, and/or hardware chipset version of the portable device(s) 106.

As discussed, the one or more subjective positional threshold values that are associated to each of the one or more transceivers 118a-118h may also be modified based on inputs provided by the user 138 to create one or more customized positional threshold values that may be populated within the portable device profile associated with the respective portable device 106. Accordingly, the one or more customized positional threshold values may also be created to specifically pertain to the make, model, version, and/or hardware chipset version of the respective portable device(s) 106.

With particular reference to the portable device(s) 106, the portable device(s) 106 may include a smart phone, a tablet, a laptop, a smart key, a key fob, a remote control, and the like that may be made by a respective manufacturer (make), may be configured as a particular model (e.g., of a plurality of models of portable devices made by the respective manufacturer), and/or a particular version (e.g., of a plurality of versions of the particular model).

In one embodiment, each portable device 106 may include a respective hardware chipset that includes a microprocessor 132 that is utilized to operably control components of the portable device 106. The microprocessor 132 may include memory, an interface circuit, and bus lines, for transferring data, sending commands, communicating with the various components and controlling an overall operation of the portable device 106.

The hardware chipset of the portable device(s) 106 may also include a communication device 134 that may be operably connected to one or more antennas (not shown). The communication device 134 may be configured to send and receive electronic signals to and/or from the vehicle 102. In particular, the communication device 134 may be configured to send and receive LF signals and RF signals. Such RF signals may include, but may not be limited to Bluetooth® communications, UWB communications, Wi-Fi communications, ZigBee communications, WiMax communications, and the like.

The portable device 106 may be configured to receive electronic signals including, but not limited to, LF polling signals and RF polling signals sent from the vehicle 102 in one or more frequencies and/or formats. For example, the communication device 134 may be configured to receive a Bluetooth® wireless polling signal sent by the communication control unit 114 of the vehicle 102 through the one or more transceivers 118a-118h. In one embodiment, the communication device 134 may be configured to operably control the one or more antennas to transmit one or more RF response signals upon the receipt of one or more RF polling signals.

The portable device(s) 106 may also include a storage unit 136 that may include various memories such as, for example L1, L2, or L3 cache or system memory. As such, the memories may include static random access memory (SRAM), dynamic RAM (DRAM), flash memory, read only memory (ROM), or other similar memory devices. The storage unit 136 may be utilized to store one or more operating systems, applications, associated operating system data, application data, vehicle system and subsystem user interface data, and the like that may be executed by the microprocessor 132. For example, the storage unit 136 may include one or more executable data files that are associated with the passive control application 108 that may be executed by the microprocessor 132 to execute the passive control application 108 on the portable device(s) 106.

In an exemplary embodiment, the storage unit 136 may include the device identification code (e.g., alpha-numeric code) that may be associated with each particular portable device(s) 106. Additionally, the storage unit 136 may include device configuration data that may include data pertaining to the make (manufacturer), model, and/or version of the portable device 106. In particular, the device configuration data may include a manufacturer code associated with the make of the portable device 106, a model number associated with the model of the portable device 106, a version code associated with the version of the portable device 106, a serial number associated with the make, mode, and version of the portable device 106, and the like.

As discussed below, the device configuration data may be received from the portable device(s) 106 and/or the external server 122 and may be analyzed by the passive control application 108 to determine the make, model, and version of each portable device 106 that wirelessly communicates with the vehicle 102. Such information may be utilized by the application 108 to thereby create one or more of the subjective positional threshold values.

In an exemplary embodiment, the one or more RF response signals transmitted by the communication device 134 to the vehicle 102 (based on the receipt of one or more RF polling signals from the vehicle 102) may include a data packet (e.g., data payload). The data packet may include the device ID of the respective portable device 106 and the device configuration data that may be retrieved from the storage unit 136. In another embodiment, one or more wireless communication signals wirelessly communicated by the external server 122 to the vehicle 102 (through the telematics control unit of the communication control unit 114) may include a data packet that includes the device ID of a particular portable device 106 (used by the user 138) and the device configuration data associated with the particular portable device 106.

In one embodiment, upon the receipt of the one or more RF response signals, the communication device 134 may be configured to analyze the signal(s) to determine an RSSI value, an AOA value, and/or a TOF value that is associated with each RF response signal for each of the transceivers 118a-118h that receive each RF response signal. The communication device 134 may also analyze the RF response signal(s) and/or the wireless communication signals (from the external server 122) to determine the device ID and device configuration data and may send respective signal data to the passive control application 108.

In one embodiment, the passive control application 108 may analyze the signal data to update the portable device profile associated with the specific portable device 106 with the make, model, and/or version of the portable device 106. As discussed below, such data may be further evaluated to determine one or more subjective positional threshold values that may include one or more subjective RSSI threshold values, subjective AOA threshold values, and/or subjective TOF threshold values that are associated with one or more of the transceivers 118a-118h of the vehicle 102. The application 108 may be further configured to utilize the one or more subjective positional threshold values to thereby create one or more customized positional threshold values that may apply to the specific type of portable device(s) 106 based on one or more customization inputs provided by the user 138.

In an alternate embodiment, the passive control application 108 may present the user 138 with a portable device configuration user interface (not shown) through the portable device(s) 106. The portable device configuration user interface may allow the user 138 to input one or more makes, models, and versions of the portable device(s) 106 used by the user 138. For example, the portable device configuration user interface may include a drop down box that includes a list of current portable device makes, models, and/or versions that may be inputted (selected) by the user 138 to allow the application 108 to update the portable device profile associated with the specific portable device(s) 106 with the make, model, and/or version of the portable device 106.

II. The Device Variance Passive Control Application and Related Methods

The components of the passive control application 108 will now be described according to an exemplary embodiment and with reference to FIG. 1. In an exemplary embodiment, the passive control application 108 may be stored on the storage unit 116 of the vehicle 102 and executed by the ECU 112 and/or the head unit. In some embodiments, the application 108 may also be stored on a memory of the ECU 112 itself and may be executed by the ECU 112. In additional embodiments, the passive control application 108 may be stored on the memory 128 of one or more servers of the externally hosted server infrastructure 122 and may be accessed by the communication control unit 114 to be executed by the ECU 112.

In one embodiment, the user 138 may actuate a customization mode of the application 108 to customize one or more passive function zones and/or one or more passive functions (e.g. customizable passive entry functions) of the one or more vehicle systems 104 of the vehicle 102. Such customization may allow the passive control application 108 to actuate one or more passive control functions by one or more respective vehicle systems 104 upon the entry or exit of the portable device(s) 106 within one or more customized passive function zones that are respectively associated with one or more particular passive functions.

As discussed in more detail below, the passive control application 108 may present the user 138 with a customization user interface (not shown) that may allow the user 138 to provide one or more customized passive function zones that may be located at one or more locations surrounding the vehicle 102 (shown in the illustrated example of FIG. 6). The one or more customized function zones may be associated by the user 138 to one or more particular functions to be executed by one or more particular vehicle systems 104 based on the determination of entry or exit of the portable device(s) 106 with respect to the one or more particular customized function zones.

Figure 2:
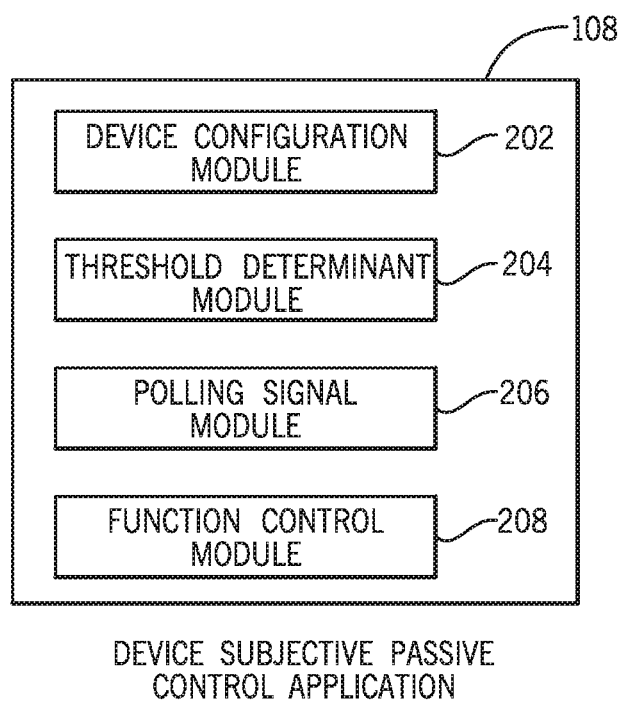
FIG. 2 is a schematic view of an exemplary operating environment of a passive control application, according to an exemplary embodiment.

FIG. 2 illustrates a schematic view of an exemplary operating environment of the passive control application 108, according to an exemplary embodiment. As shown in FIG. 2, in an illustrative embodiment, the passive control application 108 may include one or more modules 202-208 that may include a device configuration module 202, a threshold determinant module 204, a polling signal module 206, and a function control module 208. As discussed below, the modules 202-208 may execute process steps of one or more methods to determine a specific type of portable device 106 that is connected to the vehicle 102 and to determine one or more positional threshold values that pertain to the specific type of portable device 106.

The modules 202-208 may also execute process steps of one or more methods to determine if the portable device(s) 106 is located within the subjective passive function zone and/or one or more customized passive function zones as created by the application 108. Additionally, the modules 202-208 may execute the process steps of one or more methods to control one or more of the vehicle systems 104 to enable or disable one or more passive functions based on determining that the portable device(s) 106 is located within the predetermined passive function zone 110 and/or one or more customized passive function zones.

Figure 3:
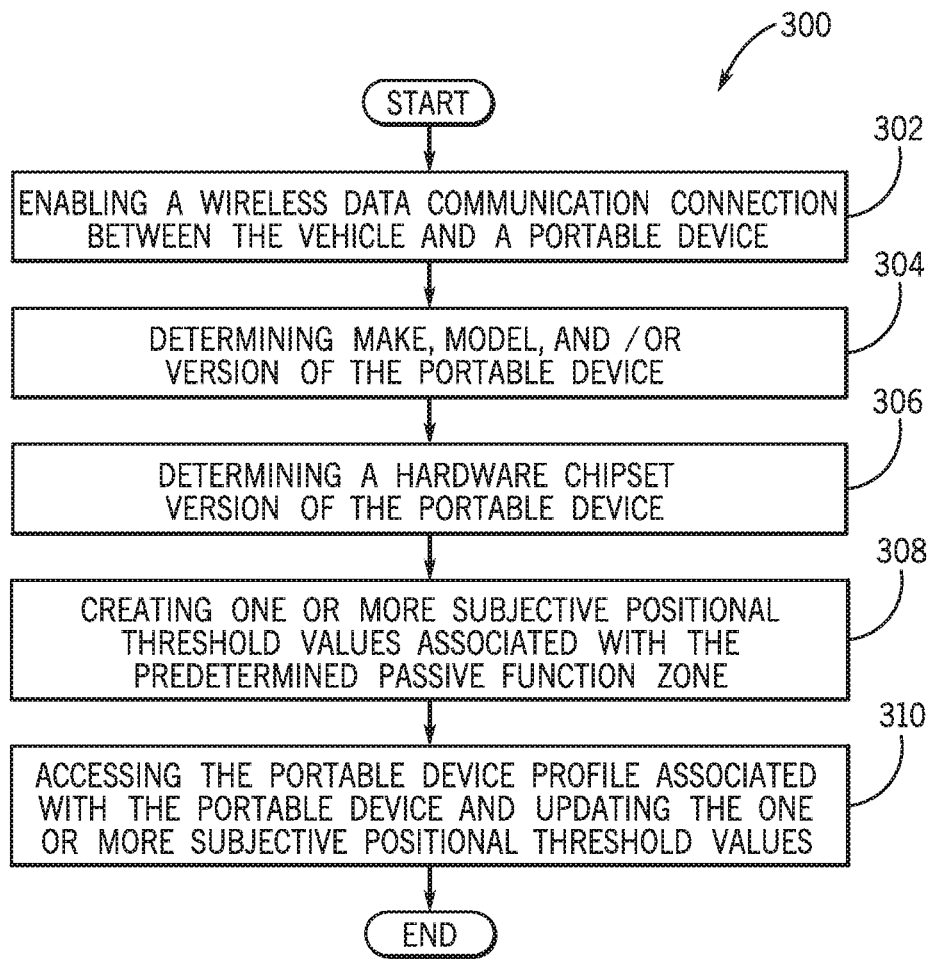
FIG. 3 is a process flow diagram of a method for determining one or more subjective positional threshold values that may be associated to a predetermined passive function zone and may be utilized for a particular make, model, version, and/or hardware chipset version of a portable device according to an exemplary embodiment.

FIG. 3 is a process flow diagram of a method 300 for determining one or more subjective positional threshold values that may be associated to a predetermined passive function zone and may be utilized for a particular make, model, version, and/or hardware chipset version of a portable device 106 according to an exemplary embodiment. FIG. 3 will be described with reference to the components of FIG. 1 and FIG. 2 though it is to be appreciated that the method 300 of FIG. 3 may be used with other systems and/or components.

In one or more embodiments, the application 108 may allow the user 138 to initially pair the portable device 106 to the vehicle 102 to allow the application 108 to associate the portable device 106 with the vehicle 102 (to link the portable device 106 to the vehicle 102 for enabling polling communications). In some configurations, the user 138 may utilize a user interface provided through the display unit of the head unit to initiate initial paring between the vehicle 102 and the portable device 106 used by the user 138.

Pairing of the portable device 106 may be completed by communicating the device ID of the portable device 106 to be stored by the ECU 112 of the vehicle 102 to allow the vehicle 102 to send RF polling signals to the portable device 106. This functionality may also allow the vehicle 102 to receive and interpret RF polling response signals that are received by the portable device 106. In other words, the initial pairing of the vehicle 102 may allow the application 108 and the vehicle 102 to acknowledge the portable device 106 as being used by the user 138. In circumstances that the user 138 utilizes a different (e.g., new) portable device 106, the application 108 may thereby allow the user 138 to initially pair the different portable device 106 to the vehicle 102. Upon the user actuation of the initial pairing between the vehicle 102 and the portable device 106, the communication control unit 114 may be configured to send one or more RF polling signals to the portable device 106. The portable device 106 may also be configured to send one or more RF polling response signals to the vehicle 102.

The method 300 may begin at block 302, wherein the method 300 may include enabling a wireless data communication connection between the vehicle 102 and a portable device 106. In an exemplary embodiment, upon initial pairing of the portable device 106 with the vehicle 102 to allow the application 108 to associate the portable device 106 with the vehicle 102, the user 138 may initiate a wireless data communication connection (e.g., Bluetooth® connection) between the vehicle 102 and a portable device 106 used (e.g., held/carried) by the user 138 based on an input of an input button (not shown) on the portable device 106. In some configurations, the user 138 may utilize a user interface provided through the display unit of the head unit to initiate the wireless data communication connection between the vehicle 102 and the portable device 106 used by the user 138.

In one embodiment, upon receipt of the one or more RF polling signals by the portable device 106, the communication device 134 may be configured to retrieve the device ID and the device configuration data from the storage unit 136 of the respective portable device 106. The communication device 134 may process one or more RF signals with respective data packets (e.g., data payload) that include the device ID and the device configuration data and may thereby utilize one or more antennas of the portable device 106 to transmit the one or more RF response signals. The one or more RF response signals may each include a data packet(s) that includes the device ID and the device configuration data to be received by one or more of the transceivers 118a-118h of the vehicle 102.

Upon the receipt of the one or more RF response signals by one or more of the transceivers 118a-118h of the vehicle 102, the communication control unit 114 may be configured to analyze the signal(s) to determine the device ID of the portable device 106. The communication control unit 114 may thereby communicate respective data to the device configuration module 202 of the passive control application 108.

In an additional embodiment, upon the pairing of the portable device 106 to the vehicle 102, the communication control unit 114 may be configured to communicate with the external server 122 to send and receive wireless communication signals. As discussed above, the external server 122 may be configured to communicate one or more wireless communication signals to the vehicle 102 (through the telematics control unit of the communication control unit 114) that may include a data packet that includes the device ID of the portable device 106 (used by the user 138) and the device configuration data associated with the particular portable device 106.

In one embodiment, the device configuration module 202 may be configured to access the portable device profile repository 120 on the storage unit 116 of the vehicle 102 and create a portable device profile (e.g., data file) that is specifically associated with the portable device 106. Upon creation of the portable device profile, the device configuration module 202 may create a data field within the portable device profile that is populated with the device identification that is associated with the portable device 106.

The method 300 may proceed to block 304, wherein the method 300 may include determining a make, a model, and/or a version of the portable device 106. In an exemplary embodiment, upon creating the portable device profile that is associated with the portable device 106 and populating the profile with device ID of the portable device 106, the device configuration module 202 may be configured to communicate with the communication control unit 114 to receive the device configuration data included within the RF response signal(s) received by one or more of the transceivers 118a-118h.

In one embodiment, the communication control unit 114 may thereby communicate the device configuration data to the device configuration module 202. As discussed above, the device configuration data may include one or more of a manufacturer code associated with the make of the portable device 106, a model number associated with the model of the portable device 106, a version code associated with the version of the portable device 106, a serial number associated with the make, model, and version of the portable device 106, and the like. The device configuration module 202 may thereby analyze the device configuration data to determine the make, the model, and/or the version of the portable device 106.

In one or more embodiments, the device configuration module 202 may analyze the device configuration data received within the RF response signal(s) and/or the wireless communication signals (communicated by the external server 122) and may utilize application metadata (not shown) stored on the storage unit 116, the storage unit 136, and/or the memory 128 to thereby determine the make, model, and/or version of the portable device 106 to be further analyzed by the application 108. In particular, the application metadata may include data that is manually updated (e.g., by manufacturers, vendors, etc.) and/or automatically updated through the internet cloud 124 with a plurality of manufacturer codes associated with various portable devices 106, a plurality of model numbers associated with a plurality of models of various portable devices 106, a plurality of version codes associated with a plurality of versions of various portable devices 106, a plurality of serial numbers associated with a plurality of makes, models, and versions of the various portable devices 106, and the like. The application metadata may thereby be maintained to include data associated with a plurality of various types of portable devices 106 that are released by various manufacturers.

In an alternate embodiment, the passive control application 108 may present the user 138 with the portable device configuration user interface (discussed above) through the portable device(s) 106. The portable device configuration user interface may allow the user 138 to input the make, model, and/or version of the portable device 106 used by the user 138 to allow the application 108 to determine the make, model, and/or the version of the portable device 106.

Upon determining the make, model, and/or the version of the portable device 106, the device configuration module 202 may be configured to access the storage unit 116 of the vehicle 102. The device configuration module 202 may further query the portable device profile repository 120 to retrieve the portable device profile associated with the portable device 106 based on the device ID of the portable device 106. In one embodiment, the device configuration module 202 may populate one or more respective fields of the portable device profile with data (e.g., one or more application codes) pertaining to the make, model, and/or the version of the portable device 106 as determined based on the RF response signal(s) sent by the portable device 106 to the vehicle 102 and the analysis of the application metadata.

The method 300 may proceed to block 306, wherein the method 300 may include determining a hardware chipset version of the portable device 106. In an exemplary embodiment, the device configuration module 202 may further analyze the make, model, and/or version of the portable device 106 to determine the hardware chipset version of the portable device 106. The hardware chipset version may include a version and/or configuration of the microprocessor 132, the version and/or configuration of the communication device 134, and/or the configuration of one or more antennas (e.g., RF antennas) of the portable device 106.

In some circumstances, the hardware chipset version may differ for a particular portable device 106 made by a single manufacturer, of a single model, and/or of a single version. Additionally, each hardware chipset may include a microprocessor 132 that may include a subjective processing power, a communication device 113 that may include a subjective signal processing power, and/or one or more antennas that may include a subjective transmission, reception, and/or signal propagation power. The different makes, models, versions, and/or hardware chipsets associated with particular makes, models, and/or versions may thereby influence the reception rate of the one or more RF polling signals by the portable device 106 and/or the transmission rate (e.g., power and/or speed of transmission) of the one or more RF response signals by the portable device 106.

Accordingly, in one or more embodiments, the device configuration module 202 may utilize the communication control unit 114 to communicate with the externally hosted server infrastructure 122 to determine a particular hardware chipset that is associated with the particular make, model, and/or version of the portable device 106. In particular, the device configuration module 202 may utilize the communication control unit 114 to communicate the particular make, model, and/or version of the portable device 106 to determine the hardware chipset from the externally hosted server infrastructure 122.

As discussed above, the memory 128 of the one or more servers of the externally hosted server infrastructure 122 may include portable device specification data. As discussed, the portable device specification data may include technical specifications related to the manufacturer, model, version, and/or hardware chipset of each portable device 106. The device configuration module 202 may accordingly analyze the portable device specification data to determine the hardware chipset version of the portable device 106.

The method 300 may proceed to block 308, wherein the method 300 may include creating one or more subjective positional threshold values associated with the predetermined passive function zone 110. In an exemplary embodiment, upon determining the make, model, and/or version of the portable device 106 (at block 304) and upon determining the hardware chipset version of the portable device 106 (at block 306), the device configuration module 202 may communicate respective data to the threshold determinant module 204 of the passive control application 108. In one embodiment, the threshold determinant module 204 may evaluate the respective data and may analyze the application metadata to determine one or more positional threshold values that may apply to each of the transceivers 118*a*-118*h* of the vehicle 102.

More specifically, the threshold determinant module 204 may evaluate the make, model, version, and/or hardware chipset version of the portable device 106 and the one or more predetermined positional threshold values that apply to the predetermined passive function zone 110 and are associated with each of the transceivers 118*a*-118*h*. The threshold determinant module 204 may thereby create one or more subjective positional threshold values by utilizing the one or more predetermined positional threshold values as starting point values.

The threshold determinant module 204 may thereby shift (e.g., adjust) the one or more predetermined positional threshold values associated with each of the transceivers 118*a*-118*h* to the one or more subjective positional threshold values that are associated to the respective transceivers 118*a*-118*h*. In other words, the one or more predetermined threshold values may be shifted to calibrate to the make, model, version, and/or the hardware chipset version of the portable device 106 by utilizing the one or more subjective positional threshold values to determine the location of the portable device 106 with respect to the predetermined passive function zone 110.

More specifically, the threshold determinant module 204 may shift a default RSSI subjective positional threshold value, a default AOA subjective positional threshold value, and/or a default TOF subjective positional threshold value that are respectively associated with each of the transceivers 118*a*-118*h* of the vehicle 102 to create and output an RSSI subjective positional threshold value, an AOA subjective positional threshold value, and/or a TOF subjective positional threshold value that is respectively associated to each of the transceivers 118*a*-118*h* of the vehicle 102.

In other words, the module 204 may adjust one or more default subjective threshold values that are respectively associated with each of the transceivers 118*a*-118*h* of the vehicle 102 to create and output one or more subjective positional threshold values that are respectively associated with each of the transceivers 118*a*-118*h*. Accordingly, the one or more predetermined positional threshold values that are associated with the predetermined passive function zone 110 are shifted to calibrate to the make, model, version, and/or the hardware chipset version of the portable device 106 to be utilized to determine if/when the portable device 106 enters/exits the predetermined passive function zone 110 as the user 138 holding/carrying the portable device 106 arrives towards the vehicle 102 or departs away from the vehicle 102.

In an alternate embodiment, the threshold determinant module 204 may utilize the communication control unit 114 to actuate a portable device threshold calibration test. The portable device threshold calibration test may include a calibration test user interface that may be displayed on the portable device 106 that may instruct the user 138 to hold the portable device 106 at various locations surrounding the vehicle 102 as the calibration test is being conducted. During the calibration test, the threshold determinant module 204 may communicate with the communication control unit 114 to utilize one or more transceivers 118a-118h to send one or more RF polling signals and to communicate data pertaining to one or more received RF response signals received from the portable device 106.

In one configuration, upon the receipt of the one or more received RF response signals during the threshold calibration test, the threshold determinant module 204 may evaluate the RF response signal(s) to determine an RSSI value, an AOA value, and/or a TOF value of the one or more received RF response signals received by each of the transceivers 118a-118h of the vehicle 102. The threshold determinant module 204 may thereby evaluate the RSSI value, the AOA value, and/or the TOF value for each of the transceivers 118a-118h against a predetermined RSSI threshold value, a predetermined AOA threshold value, and/or a predetermined TOF threshold value for each of the transceivers 118a-118h.

In one embodiment, the threshold determinant module 204 may shift (e.g., adjust) the one or more predetermined positional threshold values that are associated to each of the transceivers 118a-118h to calibrate the threshold values to pertain to the make, model, version, and/or the hardware chipset version of the portable device 106 according to the portable device threshold calibration test.

In some embodiments, the threshold determinant module 204 may create one or more (separate) subjective positional threshold values by utilizing the one or more predetermined positional threshold values as starting point values that may be shifted (e.g., adjusted) to the one or more subjective positional threshold values that may subjectively pertain to the make, model, version, and/or the hardware chipset version of the portable device 106 based on the application metadata, as discussed above. Additionally, the threshold determinant module 204 may conduct the portable device threshold calibration test to further calibrate and modify the one or more subjective positional threshold values if the RSSI value, an AOA value, and/or TOF value for each of the transceivers 118a-118h as determined based on the portable device threshold calibration test differs from the one or more subjective positional threshold values based on the application metadata. This functionality may account for any changes in transmission and/or reception of one or more wireless communication signals that may take place due to aging of the portable device 106.

The method 300 may proceed to block 310, wherein the method 300 may include accessing the portable device profile associated with the portable device 106 and updating the one or more subjective positional threshold values. In an exemplary embodiment, upon creating the one or more subjective positional threshold values for each of the transceivers 118a-118h of the vehicle 102, the threshold determinant module 204 may access the portable device profile repository 120 on the storage unit 116 of the vehicle 102 to retrieve the portable device profile that includes the device ID of the portable device 106 that is associated with the portable device 106.

In one embodiment, upon retrieving the portable device profile associated with the portable device 106, the threshold determinant module 204 may populate and update one or more respective fields of the portable device profile with the one or more subjective positional threshold values that apply to the predetermined passive function zone 110 and that are associated to each of the transceivers 118a-118h of the vehicle 102 (as created at block 308). Accordingly, as discussed below, the passive control application 108 may evaluate the one or more subjective positional threshold values to determine if the portable device 106 enters or exits the predetermined passive function zone 110 as the user 138 holding/carrying the portable device 106 arrives towards the vehicle 102 or departs away from the vehicle 102 to enable one or more passive functions of one or more of the vehicle systems 104.

Figure 4:
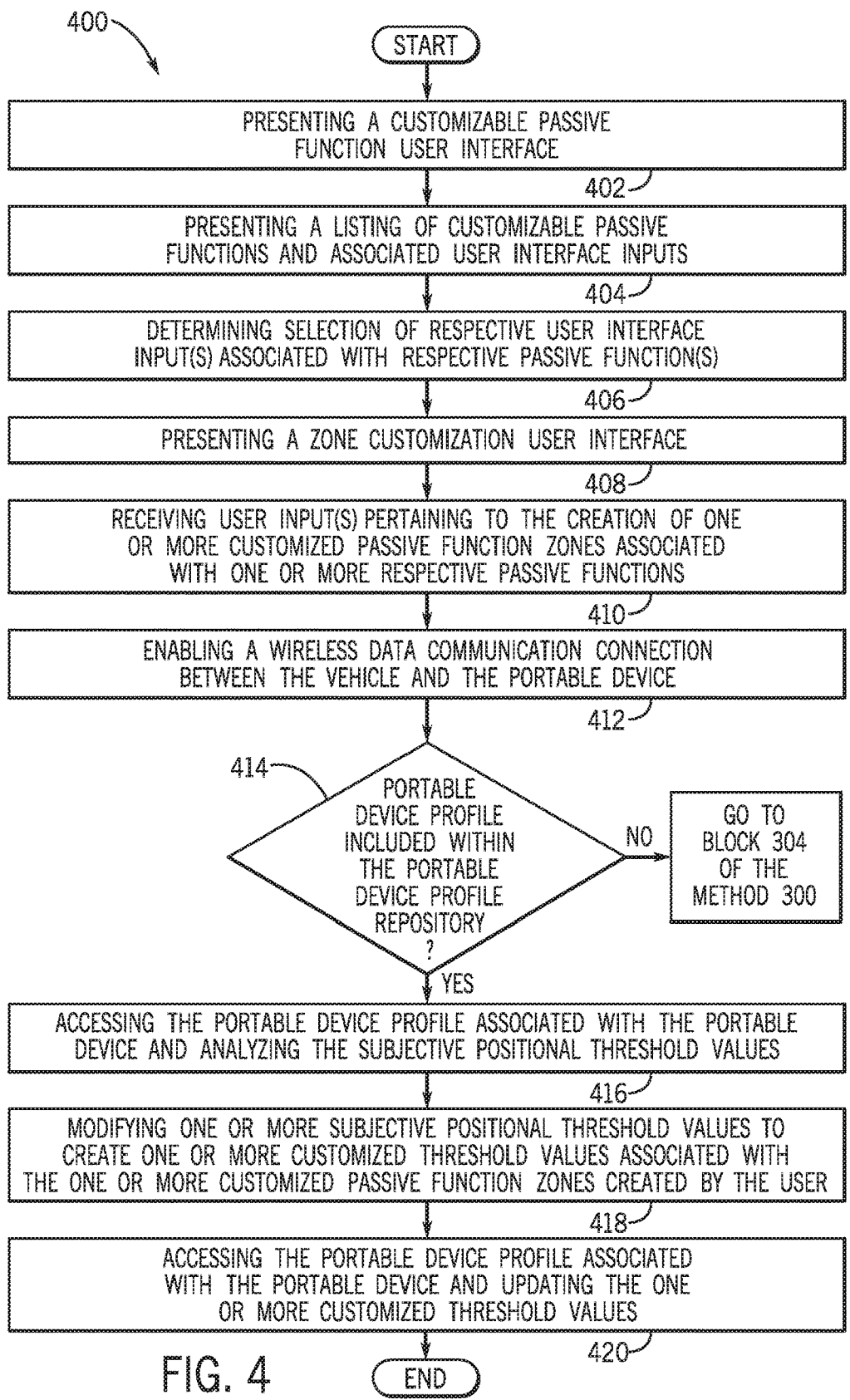
FIG. 4 is a process flow diagram of a method for determining one or more customized positional threshold values that may be associated to one or more customized passive function zones and may be utilized for a particular make, model, version, and/or hardware chipset version of a portable device according to an exemplary embodiment.

FIG. 4 is a process flow diagram of a method 400 for determining one or more customized positional threshold values that may be associated to one or more customized passive function zones and may be utilized for a particular make, model, version, and/or hardware chipset version of a portable device 106 according to an exemplary embodiment. FIG. 4 will be described with reference to the components of FIG. 1 and FIG. 2 though it is to be appreciated that the method 400 of FIG. 4 may be used with other systems and/or components. The method 400 may begin at block 402, wherein the method 400 may include presenting a customizable passive function user interface.

In one embodiment, the device configuration module 202 may present a customization mode user interface input (e.g., button) that may be presented to the user 138 through the portable device 106 (e.g., display of the portable device 106) and/or the display unit of the head unit of the vehicle 102. The user interface input may be inputted by the user 138 to actuate the customization mode of the passive control application 108. Upon actuation of the customization mode, the device configuration module 202 may communicate with the ECU 112 and/or the microprocessor 132 to present the customizable passive function user interface (not shown) that may be presented on the portable device 106 and/or through the display of the head unit of the vehicle 102. The method 400 may proceed to block 404, wherein the method 400 may include presenting a listing of customizable passive functions and associated user interface inputs. In an exemplary embodiment, the device configuration module 202 may present the customizable passive function user interface with a user interface list of a plurality of customizable passive functions that may include, but may not be limited to, customizable vehicle lighting, customizable approach automated opening of vehicle doors, customizable walk-away automated closing of vehicle doors, customizable security system enablement, customizable security system disablement, customizable vehicle enablement, customizable vehicle disablement, customizable enablement of user related settings, customizable disablement of vehicle user settings and the like. The customizable user related settings may include, but may not be limited to, customizable audio system options, customizable navigation system options, customizable seat positioning options, customizable mirror positioning options, customizable lighting options, customizable climate control (HVAC) options, customizable audio alerts, customizable visual alerts, etc.

In one embodiment, each of the customizable passive functions may be presented with an associated user interface input. The user interface input may include, but may not be limited to, a user interface checkbox, a user interface radio button, a user interface drop-down box, and the like that may allow the user 138 to select one or more respective customizable functions and provide specific vehicle system customizations associated with the one or more selected customizable functions (e.g., turn on headlights for 18 seconds).

The method 400 may proceed to block 406, wherein the method 400 may include determining selection of respective user interface input(s) associated with respective passive function(s). In one embodiment, upon the user 138 inputting the one or more interface dropdown boxes and/or text boxes that may be utilized to select one or more customizable passive functions, the device configuration module 202 may determine the selection of respective user interface input(s) associated with respective passive function(s). The device configuration module 202 may thereby communicate respective data pertaining to the determination of the one or more selected user interface inputs to the threshold determinant module 204.

The method 400 may proceed to block 408, wherein the method 400 may include presenting a zone customization user interface. In an exemplary embodiment, upon receiving respective data pertaining to the determination of the one or more selected user interface inputs from the device configuration module 202, the threshold determinant module 204 may communicate with the ECU 112 and/or the microprocessor 132 to present the zone customization user interface (not shown) that may be presented on the portable device 106 and/or through the display of the head unit of the vehicle 102.

In one embodiment, the zone customization user interface may allow the user 138 to create one or more customizable polling zones from the user's perspective based on the adjustment of one or more predetermined positional threshold values. The one or more customizable polling zones may each be respectively associated with one or more customizable passive functions (as determined at block 406). In particular, the zone customization user interface may present zone creation user interface input that may be inputted by the user 138 to create the one or more passive function zones that may be associated to one or more respective passive functions.

Upon the input by the user 138, one or more customized passive function zones may be applied by the application 108 to adjust one or more predetermined positional threshold values to calibrate to the make, model, version, and/or the hardware chipset version of the portable device 106 to be utilized to determine if/when the portable device 106 enters/exits one or more of the customized passive function zones that are associated to one or more respective passive functions as the user 138 holding/carrying the portable device 106 arrives towards the vehicle 102 or departs away from the vehicle 102. In other words, the zone customization user interface may allow the user 138 to create one or more customizable polling zones from the user's perspective based on the adjustment by the application 108 of one or more predetermined positional threshold values that are associated with the predetermined passive function zone 110.

The method 400 may proceed to block 410, wherein the method 400 may include receiving user input(s) with respect to the creation of one or more customized passive function zones (from the user's perspective) associated with one or more respective passive functions. In one or more embodiments, upon the user's input of the zone creation user interface input to create one or more passive function zones that may be associated to one or more respective passive functions, the threshold determinant module 204 may present zone creator inputs and an overhead image of the vehicle 102 (similar to illustrative example of FIG. 5).

In one configuration, the zone creator inputs may include one or more sets of touch input points that may be touched by the user 138 via the portable device 106 (e.g., display) and/or display unit of the head unit of the vehicle 102. In one embodiment, the user 138 may utilize touch pinching gestures to expand or reduce the extent of one or more passive function zones that may be associated with one or more passive functions. Upon inputting touch pinching gestures, each respective customized passive function zone may be represented by an oval shaped dashed line (similar to illustrative example of FIG. 5).

Accordingly, the user 138 may utilize touch pinching gestures to select a location within a surrounding proximity of the vehicle 102 and may expand or reduce the extent of one or more passive function zones (by pinching inward or outward to resize the oval shaped dashed line) and may input a save user input button (not shown) to create one or more customized passive function zones associated with one or more particular customizable passive functions of one or more of the vehicle systems 104. As discussed below, the one or more customized passive function zones may be created from the user's perspective. However, upon the input by the user 138, one or more customized passive function zones may be applied by the application 108 to adjust one or more predetermined positional threshold values that are associated with the predetermined passive function zone 110 to calibrate to the make, model, version, and/or the hardware chipset version of the portable device 106 to be utilized to determine if/when the portable device 106 enters/exits the predetermined passive function zone 110 as the user 138 holding/carrying the portable device 106 arrives towards the vehicle 102 or departs away from the vehicle 102.

In one embodiment, upon receiving the input of the save user input button, the threshold determinant module 204 may register the one or more customized passive function zones to be further evaluated to determine one or more associated customized passive thresholds for each of the transceivers 118a-118h that may be associated with the one or more customized passive function zones, as discussed below. It is to be appreciated that the zone creator inputs may include one or more alternate set of input points that may be inputted by additional means (e.g., touchpad, touch input arrows, input buttons) to expand or reduce the extent of one or more passive function zones that may be associated with one or more passive functions.

The method 400 may proceed to block 412, wherein the method 400 may include enabling a wireless data communication connection between the vehicle 102 and the portable device 106. In one embodiment, the threshold determinant module 204 may allow the user 138 to initially pair the portable device 106 to the vehicle 102 to allow the application 108 to associate the portable device 106 with the vehicle 102. The initial pairing may occur upon/after the creation of one or more customized passive function zones if the user 138 has not previously paired the (particular) portable device 106 to the vehicle 102. For example, if the user 138 is using a new portable device 106 that replaces an older portable device 106, the user 138 may initially pair the new portable device 106 upon/after the creation of one or more customized passive function zones to associate the new portable device 106 to the vehicle 102. Pairing of the portable device 106 may be completed by communicating the device ID of the portable device 106 to be stored by the ECU 112 of the vehicle 102 to allow the vehicle 102 to send RF polling signals to the portable device 106.

In one or more embodiments, upon determining that the portable device 106 has been initially paired with the vehicle 102 based on the reception of one or more RF polling response signals from the portable device 106 (which includes the device ID of the paired portable device), the threshold determinant module 204 may communicate with the communication control unit 114 of the vehicle 102 to enable a wireless data communication connection (e.g., Bluetooth® connection) with the communication device 134 of the portable device 106. In an another embodiment, the threshold determinant module 204 may utilize the portable device 106 and/or the display unit of the head unit to prompt the user 138 to initialize the wireless connection between the vehicle 102 and the portable device 106. In additional embodiments, the establishment of a connection with the portable device 106 may be triggered to occur based on a separate (individual) user actuated event. For example, the opening of a door of the vehicle 102, the enablement of an ignition mode of the vehicle 102, or the input of a button of the portable device 106 may trigger the establishment of the wireless data communication connection between the vehicle 102 and the portable device 106. Upon the initial pairing and wireless data communication connection between the vehicle 102 and the portable device 106, the communication control unit 114 may be configured to continue to send one or more RF polling signals to the portable device 106.

The method 400 may proceed to block 414, wherein the method 400 may include determining if a portable device profile associated with the portable device 106 is included within the portable device profile repository 120. In one embodiment, upon receipt of the one or more RF polling signals by one or more of the transceivers 118a-118h, the communication device 134 may retrieve the device ID of the respective portable device 106 from the storage unit 136. The communication device 134 may transmit the one or more RF response signals that may include a data packet that includes the device ID to be received by one or more of the transceivers 118a-118h of the vehicle 102.

Upon the receipt of the one or more RF response signals by one or more of the transceivers 118a-118f, the communication control unit 114 may be configured to analyze the signal(s) to determine the device ID of the portable device 106 included within a data packet (e.g., data payload) of each of the RF response signals (as discussed above). The communication control unit 114 may thereby communicate data pertaining to the device ID of the portable device 106 to the threshold determinant module 204 of the passive control application 108.

In an additional embodiment, upon the pairing of the portable device 106 to the vehicle 102, the communication control unit 114 may be configured to communicate with the external server 122 to send and receive wireless communication signals. As discussed above, the external server 122 may be configured to communicate one or more wireless communication signals to the vehicle 102 (through the telematics control unit of the communication control unit 114) that may include a data packet that includes the device ID of the portable device 106 (used by the user 138) and the device configuration data associated with the particular portable device 106.

In one configuration, the threshold determinant module 204 may be configured to access the portable device profile repository 120 on the storage unit 116 of the vehicle 102 and may query the portable device profile repository 120 to determine if a portable device profile that is associated with the portable device 106 has been previously created and is included within the portable device profile repository 120. This determination may indicate if the passive control application 108 previously paired the portable device 106 and the vehicle 102, enabled a wireless data communication connection between the vehicle 102 and the portable device 106, and created one or more subjective positional threshold values associated with the predetermined passive function zone 110 (based on the execution of the method 300 of FIG. 3). For example, this determination may allow the application 108 to determine if the user 138 is using an additional/different (e.g., new) portable device 106 which may not have been previously paired and/or connected to the vehicle 102.

If it is determined that the portable device profile is not included within the portable device profile repository 120 (at block 414), the passive control application 108 may execute the process step of block 304 of the method 300, wherein the device configuration module 202 may determine the make, model, and/or version of the portable device 106. The passive control application 108 may thereby execute the remaining process steps of blocks 306-310 to update the newly created portable device profile associated with the portable device 106 with one or more subjective positional threshold values. This functionality may ensure that a newer/newly released make, model, and/or version of portable device 106 (that replaced an older portable device make, model, and/or version) used by the user 138 is accounted for with respect to efficiently determining when the portable device 106 enters or exits the predetermined passive function zone 110 and/or one or more customized passive function zones as the user 138 holding/carrying the portable device 106 arrives towards the vehicle 102 or departs away from the vehicle 102.

If it is determined that the portable device profile is included within the portable device profile repository 120 (at block 414), the method 400 may proceed to block 416, wherein the method 400 may include accessing the portable device profile associated with the portable device 106 and analyzing the one or more subjective positional threshold values. In an exemplary embodiment, upon retrieving the portable device profile associated with the portable device 106 from the portable device profile repository 120, the threshold determinant module 204 may access the one or more subjective positional threshold values.

Upon accessing the one or more subjective positional threshold values, the threshold determinant module 204 may analyze the one or more subjective positional threshold values that are associated with one or more of the transceivers 118a-118h. In one embodiment, the threshold determinant module 204 may compare the locations of the one or more (user created) customized passive function zones against the location of the predetermined passive function zone 110.

The method 400 may proceed to block 418, wherein the method 400 may include modifying one or more subjective positional threshold values to create one or more customized positional threshold values associated with the one or more passive function zones created by the user 138. In an exemplary embodiment, upon analyzing the one or more subjective positional threshold values that are associated with one or more of the transceivers 118a-118h and comparing the locations of the one or more customized passive function zones against the location of the predetermined passive function zone, the threshold determinant module 204 may modify one or more of the subjective positional threshold values for each of the respective customized passive function zones.

In particular, the threshold determinant module 204 may create the (separate) customized positional threshold values by modifying (e.g., adjusting) the one or more subjective positional threshold values associated with one or more of the transceivers 118a-118h based on the difference in locations (locational coordinates, measurements with respect to the distance from the vehicle 102) of the respective customized passive function zones and the predetermined passive function zone 110. In other words, the threshold determinant module 204 may use the one or more subjective positional threshold values associated with or more respective transceivers 118a-118h as one or more start point values to thereby create one or more customized positional threshold values that are associated to the one or more transceivers 118a-118h and which apply to one or more respective customized passive function zones, as created by the user 138.

The creation of the one or more customized positional threshold values based on the modification of the one or more subjective positional threshold values accordingly ensures that the one or more customized positional threshold values and associated customized passive function zones subjectively pertain to the make, model, version, and/or hardware chipset version of the portable device 106.

The method 400 may proceed to block 420, wherein the method 400 may include accessing the portable device profile associated with the portable device 106 and updating the one or more customized positional threshold values. In an exemplary embodiment, upon creating the one or more customized positional threshold values for each of the transceivers 118a-118h of the vehicle 102, the threshold determinant module 204 may access the portable device profile repository 120 on the storage unit 116 of the vehicle 102 to retrieve the portable device profile associated with the portable device 106.

In one embodiment, upon retrieving the portable device profile associated with the portable device 106, the threshold determinant module 204 may populate and update one or more respective fields of the portable device profile with the one or more customized positional threshold values that apply to the one or more customized passive function zones and are associated with each of the transceivers 118a-118h of the vehicle 102. Accordingly, as discussed below, the passive control application 108 may evaluate the one or more customized positional threshold values to determine if the portable device 106 enters or exits one or more of the customized passive function zones as the user 138 holding/carrying the portable device 106 arrives towards the vehicle 102 or departs away from the vehicle 102 to enable one or more passive functions of one or more of the vehicle systems 104.

Based on the execution of the method 300 and the method 400 by the passive control application 108 and/or data that is communicated by the externally hosted server infrastructure 122 to the vehicle 102 through the internet cloud 124 the one or more portable device profiles associated with one or more respective portable devices 106 may be updated to include dynamic threshold values that may respectively and specifically pertain to subjective makes, models, versions and/or hardware chipset versions of one or more particular portable devices 106. Accordingly, the application 108 may also provide dynamic positional thresholds values to account for new makes, models, and/or versions of portable devices 106 (e.g., that are new to the market).

Figure 5:
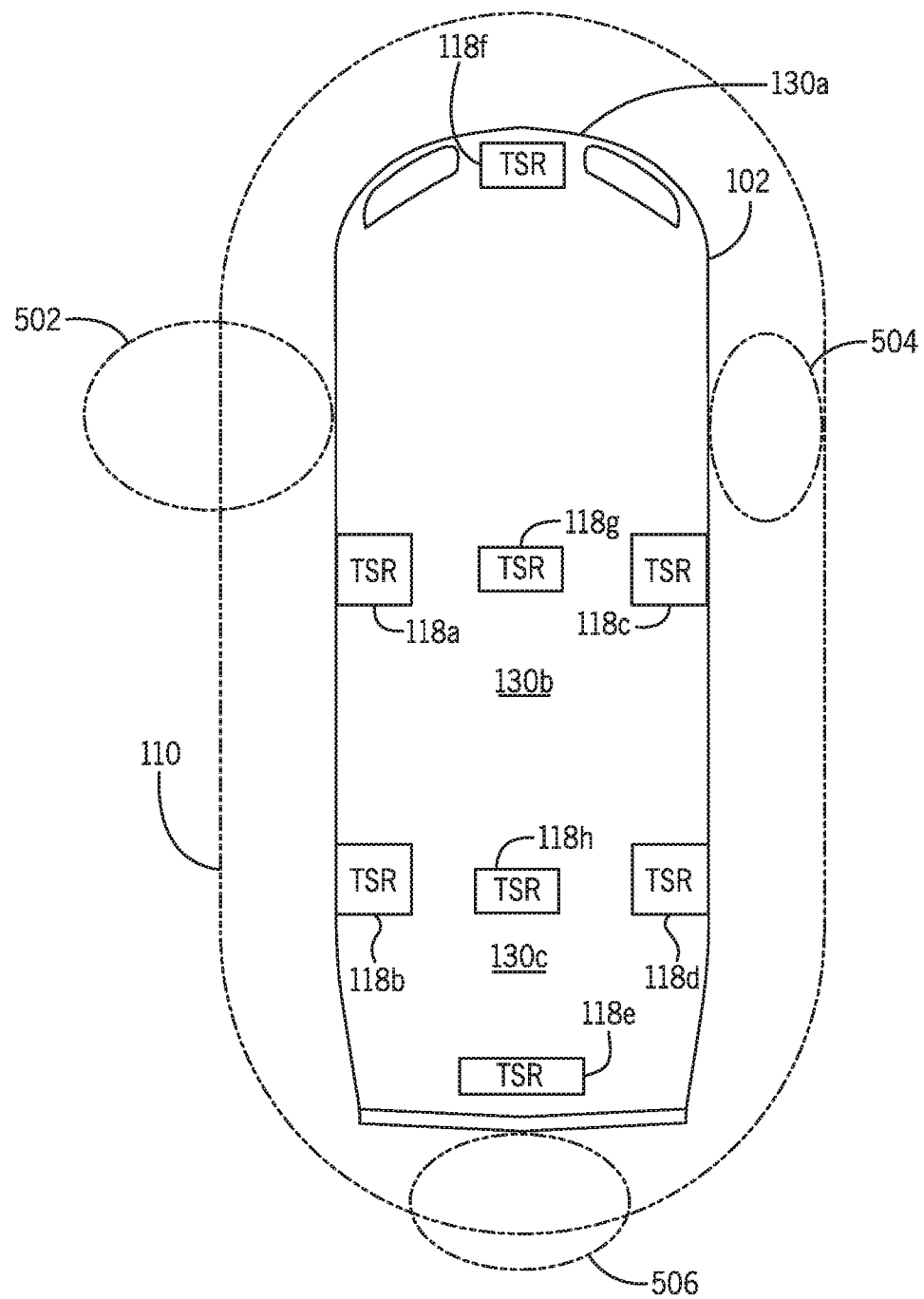
FIG. 5 is an illustrative example of the predetermined passive function zone and a plurality of passive function zones according to an exemplary embodiment.

FIG. 5 is an illustrative example of the predetermined passive function zone 110 and a plurality of passive function zones 502, 504, 506 according to an exemplary embodiment. As represented, the user 138 may create the passive function zones 502, 504, 506 by utilizing the customized passive function user interface, as discussed above, to create customized passive function zones 502, 504, 506 of various sizes that may be located at various locations with respect to the vehicle 102 and/or the predetermined passive function zone 110.

For example, the customized passive function zone 502 may be created by the user 138 (from the user's perspective) to actuate customized enablement or disablement of the vehicle 102 based on the application 108 determining that the portable device 106 (e.g., user holding the portable device 106) enters or exits the customized passive function zone 502. Similarly, the customized passive function zone 506 may be created by the user 138 (from the user's perspective) to actuate automatic opening or closing of a trunk door (not shown) at the rear portion 130c of the vehicle 102 based on the application 108 determining that the portable device 106 enters or exits the zone 506.

With continued reference to the illustrative example of FIG. 5, as discussed above, upon the execution of the method 300, the passive control application 108 may determine one or more subjective positional threshold values for each of the transceivers 118a-118h that may subjectively pertain to a particular make, model, version, and/or hardware chipset version of one or more portable devices 106 that wirelessly communicate with the vehicle 102. The one or more subjective positional threshold values may include one or more RSSI values, one or more AOA values, and/or one or more TOF values that may be specifically associated with one or more of the transceivers 118a-118h of the vehicle 102.

Figure 6:
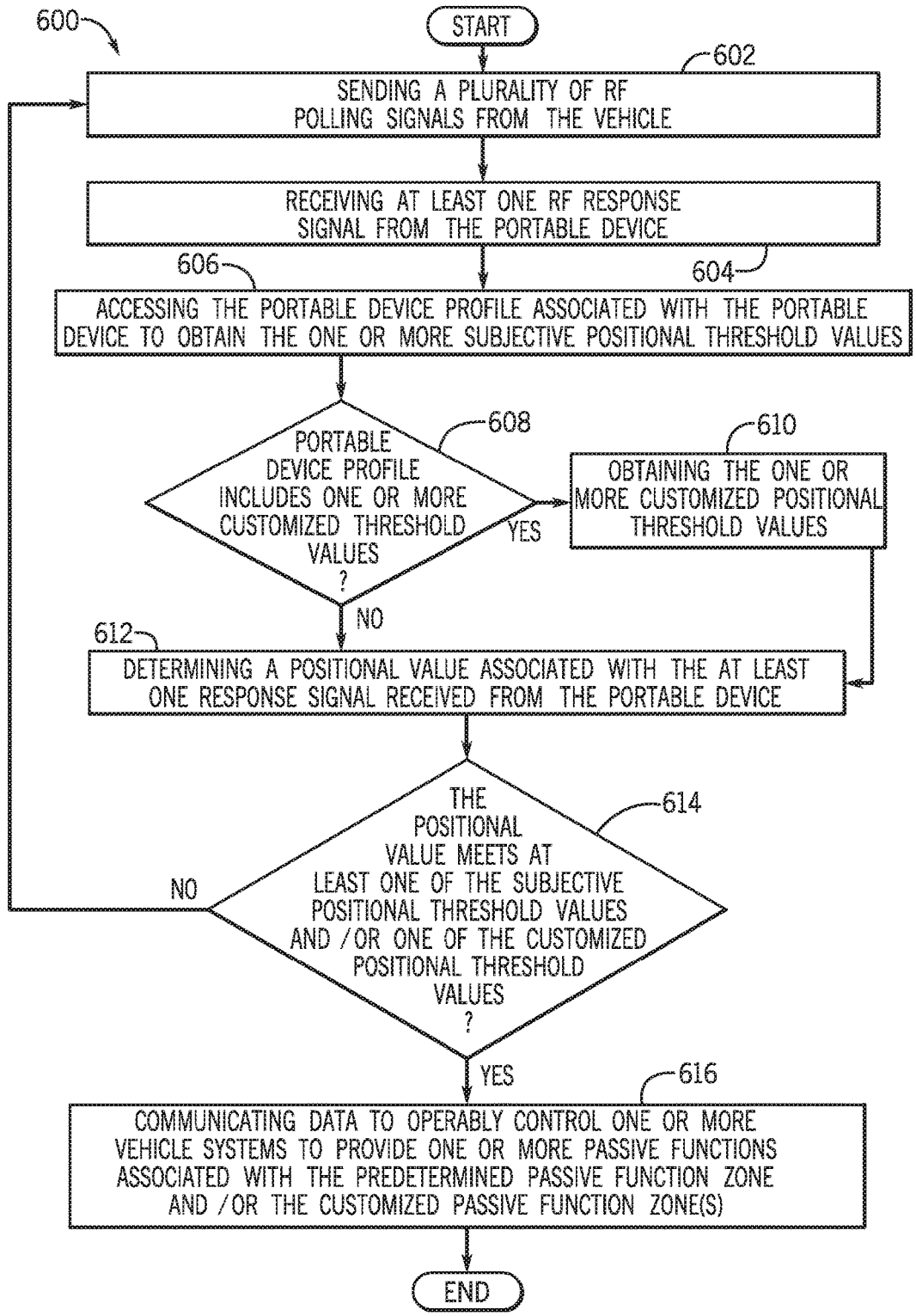
FIG. 6 is a process flow diagram for determining if the portable device is located within at least one passive function zone and controlling one or more of the vehicle systems to enable or disable at least one passive function according to an exemplary embodiment.

FIG. 6 is a process flow diagram for determining if the portable device 106 is located within at least one passive function zone and controlling one or more of the vehicle systems to enable or disable at least one passive function according to an exemplary embodiment. FIG. 6 will be described with reference to the components of FIG. 1 and FIG. 2 though it is to be appreciated that the method 600 of FIG. 6 may be used with other systems and/or components. The method 600 may begin at block 602, wherein the method 600 may include sending a plurality of RF polling signals from the vehicle 102.

In an exemplary embodiment, upon creating the one or more subjective positional threshold values associated with the predetermined passive function zone 110 (as discussed at block 308) and/or upon creating the one or more customized threshold values associated with the one or more customized passive function zones (as discussed at block 418), the threshold determinant module 204 may communicate data pertaining to the creation of the one or more passive function zones to the polling signal module 206. In one embodiment, the polling signal module 206 may communicate with the communication control unit 114 of the vehicle 102 to send a plurality of RF polling signals from the vehicle 102. The communication control unit 114 may accordingly control the operation of the transceivers 118a-118h to transmit one or more RF communication signals in the form of one or more RF polling signals to be received by the previously paired portable device 106.

The method 600 may proceed to block 604, wherein the method 600 may include receiving at least one RF response signal from the portable device 106. In an exemplary embodiment, upon the receipt of one or more of the RF polling signals by the communication device 134 of the previously paired portable device 106, the communication device 134 may transmit one or more respective RF response signals. The one or more RF response signals may be received by one or more of the transceivers 118a-118h. Upon the receipt of the one or more RF response signals by one or more of the transceivers 118a-118h, the communication control unit 114 may further analyze the one or more RF response signals.

The method 600 may proceed to block 606, wherein the method 600 may include accessing the portable device profile associated with the portable device 106 to obtain the one or more subjective positional threshold values. In an exemplary embodiment, the polling signal module 206 may access the portable device profile stored within the portable device profile repository 120 on the storage unit 116 to access the one or more fields that include the one or more subjective positional threshold values.

Upon accessing the one or more fields, the polling signal module 206 may obtain the one or more subjective positional threshold values associated with each of the transceivers 118a-118h of the vehicle 102. As discussed, the one or more subjective positional threshold values may be subjectively utilized to evaluate the location of the make, model, version, and/or hardware chipset version of the portable device 106 with respect to the predetermined passive function zone 110.

The method 600 may proceed to block 608, wherein the method 600 may include determining if the portable device profile includes one or more customized threshold values. In one embodiment, the polling signal module 206 may evaluate the portable device profile associated with the portable device 106 to determine if one or more fields include one or more customized positional threshold values that were created by the user 138 (as discussed above with respect to the method 400). In other words, the polling signal module 206 may evaluate the portable device profile to determine if one or more customized passive functional zones were created by the threshold determinant module 204 based on input(s) provided by the user 138.

If it is determined that the portable device profile includes one or more customized threshold values (at block 608), the method 600 may proceed to block 610, wherein the method 600 may include obtaining the one or more customized positional threshold values. In an exemplary embodiment, the polling signal module 206 may obtain the one or more customized threshold values associated with each of the transceivers of the vehicle 102 from one or more fields of the portable device profile associated with the portable device 106.

The method 600 may proceed to block 612, wherein the method 600 may include determining a positional value associated with at least one RF response signal received from the portable device 106. In one embodiment, the communication control unit 114 may be configured to evaluate a most recently received (e.g., latest received) RF response signal (received by one or more of the transceivers 118a-118h) to determine one more respective RSSI values. The one or more respective RSSI values may be determined for each of the one or more of the plurality of transceivers 118a-118h that received the most recently received RF response signal. In other words, the one or more RSSI values may be associated with the received signal strength of the respective RF response signal received by one or more of the transceivers 118a-118h. The communication control unit 114 may thereby communicate the one or more RSSI values to the polling signal module 206 to be further analyzed.

In another embodiment, the communication control unit 114 may be additionally or alternatively configured to evaluate the most recently received RF response signal to determine a respective AOA value for each of the one or more of the transceivers 118a-118h that received the most recently received RF response signal. In other words, the one or more AOA values may be associated with the angle of arrival of the most recently received RF response signal received by one or more of the plurality of transceivers 118a-118h. The communication control unit 114 may thereby communicate the one or more AOA values to the polling signal module 206 to be further analyzed.

In yet another embodiment, the communication control unit 114 may be additionally or alternatively configured to evaluate the most recently received RF response signal to determine a respective TOF value for each of the one or more of the plurality of transceivers 118a-118h that received the most recently received RF response signal. In other words, the one or more TOF values are associated with the time of flight of the most recently received RF response signal received by one or more of the plurality of transceivers 118a-118h. The communication control unit 114 may thereby communicate the TOF value(s) to the polling signal module 206 to be further analyzed.

The method 600 may proceed to block 614, wherein the method 600 may include determining if the positional value meets one or more subjective positional threshold values and/or one or more customized positional threshold values. In an exemplary embodiment, the polling signal module 206 may compare the one or more positional values determined based on the most recent RF response signal received by one or more of the plurality of transceivers 118a-118h against one or more subjective positional threshold values associated with one or more respective transceivers 118a-118h. Additionally, if one or more customized positional threshold values have been obtained by the polling signal module 206 (at block 612), the polling signal module 206 may compare the one or more positional values determined based on the most recent RF response signal received by one or more of the plurality of transceivers 118a-118h against the one or more customized positional threshold values associated with one or more respective transceivers 118a-118h.

With reference again to the illustrative example of FIG. 5, in one embodiment, the most recently received (e.g., latest received) RF response signal that is transmitted by the portable device 106 and is received by one or more of the transceivers 118a-118h may be evaluated by the communication control unit 114 to determine one or more positional values that may include, but may not be limited to, a RSSI value, an AOA value, and/or a TOF value that pertain to one or more transceivers 118a-118h that receive the most recently received RF response signal. The communication control unit 114 may thereby communicate respective data to the polling signal module 206. The polling signal module 206 may compare the positional value(s), including the RSSI value, the AOA value, and/or the TOF value pertaining to one or more of the transceivers 118a-118h against the one or more subjective positional threshold values associated to one or more of the respective transceivers 118a-118h to determine if the portable device 106 (e.g., user 138 holding/carrying the portable device 106) enters or exits the predetermined passive function zone 110.

Additionally, when the polling signal module 206 obtains the one or more customized positional threshold values (at block 610), one or more of the positional values that may include the RSSI value, the AOA value, and/or the TOF value (determined for the most recently received RF response signal) associated with one or more transceivers 118a-118h may be compared with one or more of the customized positional threshold values to determine if the positional value(s) meet at least one customized positional threshold value. The polling signal module 206 may thereby determine if the portable device 106 (e.g., the user 138 holding/carrying the portable device 106) enters or exits one or more of the customized passive function zones 502, 504, 506.

In some embodiments, the polling signal module 206 may be configured to compare any combination of RSSI values, AOA values, and/or TOF values against one or more respective RSSI threshold values, one or more AOA threshold values, and/or one or more TOF threshold values. The combination of RSSI values, AOA values, and/or TOF values may be utilized to determine to determine if the portable device(s) 106 is within or outside the predetermined passive function zone 110 and/or one or more of the customized passive function zones 502, 504, 506.

In an exemplary embodiment, the polling signal module 206 may determine and evaluate one or more prior positions of the portable device 106 that are determined based on the analysis of one or more RF response signals that proceed the most recently received RF response signal. Based on the analysis of the one or more RF response signals that proceed the most recently received RF response signal, the polling signal module 206 may determine if the portable device 106 enters or exits the predetermined passive function zone 110 and/or one or more customized passive function zones 502, 504, 506 upon determining that the positional value meets at least one of the subjective positional threshold values and/or at least one of the customized positional threshold values.

With continued reference to FIG. 6, if it is determined that the positional value meets at least one of the subjective positional threshold values and/or one of the customized positional threshold values (at block 614), the method 600 may proceed to block 616, wherein the method 600 may include communicating data to operably control one or more vehicle systems 104 to provide one or more passive functions associated with the predetermined passive function zone 110 and/or the customized passive function zone(s). In an exemplary embodiment, upon determining that the positional value determined to be associated to one or more particular transceivers 118a-118h meets at least one of the subjective positional threshold values and/or one or more customized positional threshold values that are associated to the one or more respective transceivers 118a-118h, the polling signal module 206 may communicate data pertaining to meeting of the one or more subjective positional threshold values and/or the one or more particular customized threshold values to the function control module 208.

In one embodiment, the function control module 208 may thereby communicate with the ECU 112 of the vehicle 102 to operably control one or more of the vehicle systems 104 to execute one or more passive functions that are associated to the predetermined passive function zone 110 and/or one or more of the customized passive function zones. The ECU 112 may accordingly communicate with one or more respective vehicle systems 104 to control the vehicle systems 104 to execute the one or more passive functions that are associated with the predetermined passive function zone 110 and/or one or more of the customized passive function zones.

Referring again to the illustrative example of FIG. 5, if the polling signal module 206 determines that the RSSI value of the RF response signal received by the transceiver 118a meets the RSSI subjective positional threshold value that is associated with the transceiver 118a and may be applied for the predetermined passive function zone 110, the polling signal module 206 may communicate with the ECU 112 of the vehicle 102 to control one or more of the vehicle systems 104 to execute one or more passive functions that are associated with the predetermined passive function zone 110. One or more of the vehicle systems 104 may thereby execute one or more passive functions that may include, but may not be limited to, passive entry/exit functions such as approach unlocking of vehicle doors, walk-away locking of vehicle doors, welcome lighting, enablement of user related settings, disablement of user related settings, and the like.

Additionally or alternatively, if the polling signal module 206 determines that the RSSI value of the RF response signal received by the transceiver 118a meets the RSSI customized positional threshold value associated with the customized passive function zone 502, the polling signal module 206 may communicate with the ECU 112 of the vehicle 102 to control the vehicle systems 104 to execute one or more user specified passive functions that are associated with the customized passive function zone 502.

As discussed with respect to the illustrative example of FIG. 5 above, for example, the customized passive function zone 502 may be created by the user 138 to actuate customized enablement or disablement of the vehicle 102 based on the application 108 determining that the portable device 106 (e.g., user holding the portable device 106) enters or exits the zone 502. Accordingly, if the polling signal module 206 determines that the RSSI value of the RF response signal received by the transceiver 118a meets the customized RSSI threshold value associated with the customized passive function zone 502, the polling signal module 206 may communicate with the ECU 112 of the vehicle 102 to control the vehicle systems 104 enable or disable the vehicle 102. The polling signal module 206 may further determine and evaluate one or more prior positions that are determined based on one or more RF response signals that proceed the most recently received RF response signal received by the transceiver 118a. Consequently, the polling signal module 206 may determine if the portable device 106 enters or exits the predetermined passive function zone 110 and/or one or more customized passive function zones 502.

The passive control application 108 accordingly provides that the make, model, version, and/or hardware chipset version of the portable device 106 are specifically accounted for when determining the position of the portable device 106 with respect to the predetermined passive function zone 110 and the customized passive function zones 502, 504, 506. This functionality enables the passive control application 108 to efficiently determine when the portable device 106 (e.g., user holding the portable device 106) enters or exits the predetermined passive function zone 110 and/or one or more of the customized passive function zones 502, 504, 506 as the user 138 holding the portable device 106 arrives towards the vehicle 102 or departs away from the vehicle 102 to provide one or more passive functions in an efficient and consistent manner.

Figure 7:
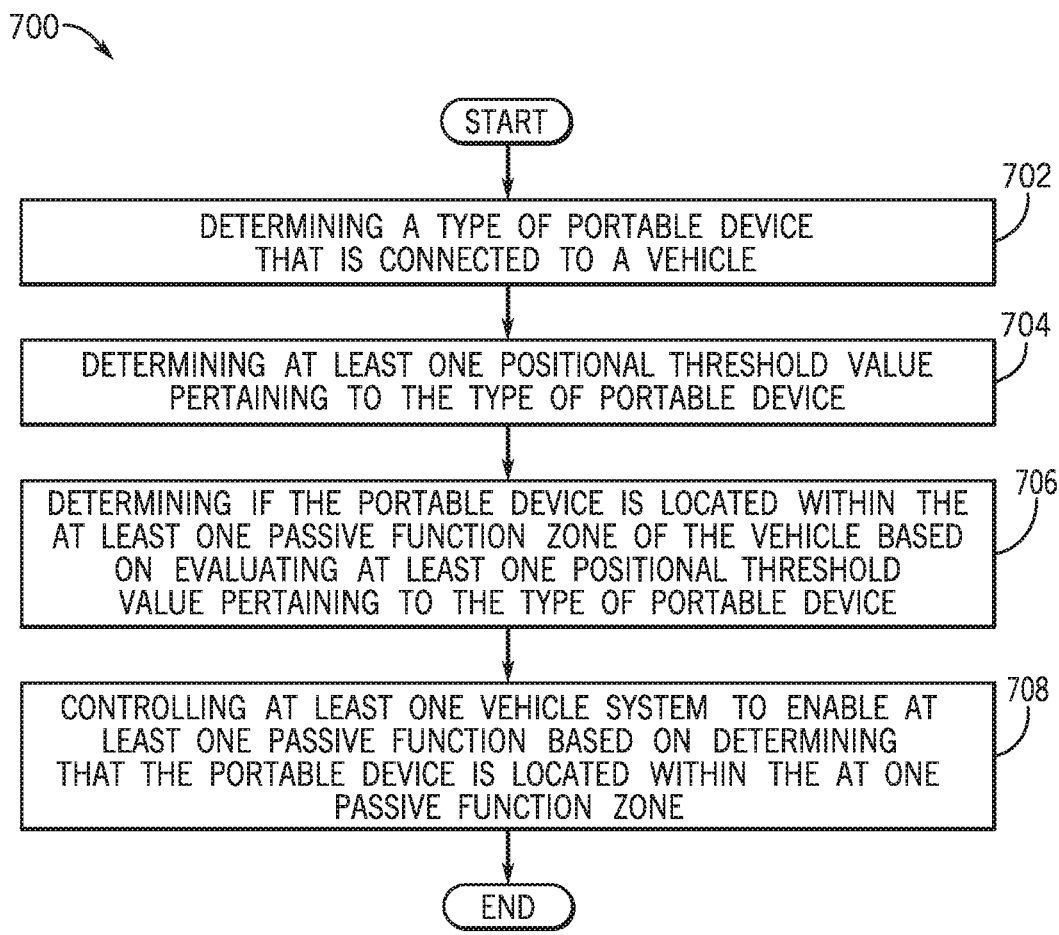
FIG. 7 is a process flow diagram of a method for providing device subjective vehicle passive entry functions according to an exemplary embodiment.

FIG. 7 is a process flow diagram of a method 700 for providing device subjective vehicle passive entry functions according to an exemplary embodiment. FIG. 7 will be described with reference to the components of FIG. 1 and FIG. 2 though it is to be appreciated that the method 700 of FIG. 7 may be used with other systems and/or components. The method 700 may begin at block 702, wherein the method 700 may include determining a type of portable device 106 that is connected to a vehicle 102.

The method 700 may proceed to block 704, wherein the method 700 may include determining at least one positional threshold value pertaining to the type of portable device 106. In one embodiment, the at least one positional threshold value is associated with at least one passive function zone of the vehicle 102. The method 700 may proceed to block 706, wherein the method 700 may include determining if the portable device is located within the at least one passive function zone of the vehicle 102 based on the evaluating at least one positional threshold value pertaining to the type of portable device 106. The method 700 may proceed to block 708, wherein the method 700 may include controlling at least one vehicle system 104 to enable at least one passive function based on determining that the portable device 106 is located within the at one passive function zone.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It can be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art.

The invention claimed is:

1. A computer-implemented method for providing device subjective vehicle passive functions comprising:
    determining a type of portable device that is connected to a vehicle;
    determining at least one positional threshold value pertaining to the type of portable device, wherein the at least one positional threshold value is associated with at least one passive function zone of the vehicle;
    determining if the portable device is located within the at least one passive function zone of the vehicle based on evaluating at least one positional threshold value pertaining to the type of portable device; and
    controlling at least one vehicle system to enable at least one passive function based on determining that the portable device is located within the at one passive function zone.

2. The computer-implemented method of claim 1, wherein determining the type of portable device includes determining at least one of: a make of the portable device, a model of the portable device, and a version of the portable device, wherein the make of the portable device is associated with a manufacturer of the portable device.

3. The computer-implemented method of claim 2, wherein determining the type of portable device includes determining a hardware chipset version of a hardware chipset of the portable device.

4. The computer-implemented method of claim 3, wherein determining the at least one positional threshold value pertaining to the type of portable device includes determining at least one subjective positional threshold value that pertains to at least one of: the make of the portable device, the model of the portable device, the version of the portable device, and the hardware chipset version of the hardware chipset of the portable device.

5. The computer-implemented method of claim 4, wherein determining the at least one positional threshold value pertaining to the type of portable device includes evaluating at least one predetermined positional threshold value that applies to a predetermined passive function zone that is located within a predetermined proximity of the vehicle.

6. The computer-implemented method of claim 5, wherein determining the at least one positional threshold value pertaining to the type of portable device includes shifting the at least one predetermined positional threshold value to create the at least one subjective positional threshold value.

7. The computer-implemented method of claim 6, wherein the at least one positional threshold value is shifted to calibrate to at least one of: the make of the portable device, the model of the portable device, the version of the portable device, and the hardware chipset version of the portable device.

8. The computer-implemented method of claim 6, wherein determining the at least one positional threshold value pertaining to the type of portable device includes determining at least one customized positional threshold value that applies to at least one customized passive function zone, wherein the at least one customized passive function zone is associated with at least one customized passive function.

9. The computer-implemented method of claim 6, wherein determining the at least one positional threshold value pertaining to the type of portable device includes creating the at least one customized positional threshold value by modifying the at least one subjective positional threshold value based on a location of the at least one customized passive function zone.

10. A system for providing device subjective vehicle passive functions, comprising:
    a memory storing instructions when executed by a processor cause the processor to:
    determine a type of portable device that is connected to a vehicle;
    determine at least one positional threshold value pertaining to the type of portable device, wherein the at least one positional threshold value is associated with at least one passive function zone of the vehicle;
    determine if the portable device is located within the at least one passive function zone of the vehicle based on evaluating at least one positional threshold value pertaining to the type of portable device; and
    control at least one vehicle system to enable at least one passive function based on determining that the portable device is located within the at one passive function zone.

11. The system of claim 10, wherein determining the type of portable device includes determining at least one of: a make of the portable device, a model of the portable device, and a version of the portable device, wherein the make of the portable device is associated with a manufacturer of the portable device.

12. The system of claim 11, wherein determining the type of portable device includes determining a hardware chipset version of a hardware chipset of the portable device.

13. The system of claim 12, wherein determining the at least one positional threshold value pertaining to the type of portable device includes determining at least one subjective positional threshold value that pertains to at least one of: the make of the portable device, the model of the portable device, the version of the portable device, and the hardware chipset version of the hardware chipset of the portable device.

14. The system of claim 13, wherein determining the at least one positional threshold value pertaining to the type of portable device includes evaluating at least one predetermined positional threshold value that applies to a predetermined passive function zone that is located within a predetermined proximity of the vehicle.

15. The system of claim 14, wherein determining the at least one positional threshold value pertaining to the type of portable device includes shifting the at least one predetermined positional threshold value to create the at least one subjective positional threshold value.

16. The system of claim 15, wherein the at least one positional threshold value is shifted to calibrate to at least one of: the make of the portable device, the model of the portable device, the version of the portable device, and the hardware chipset version of the portable device.

17. The system of claim 15, wherein determining the at least one positional threshold value pertaining to the type of portable device includes determining at least one customized positional threshold value that applies to at least one customized passive function zone, wherein the at least one customized passive function zone is associated with at least one customized passive function.

18. The system of claim 15, wherein determining the at least one positional threshold value pertaining to the type of portable device includes creating the at least one customized positional threshold value by modifying the at least one subjective positional threshold value based on a location of the at least one customized passive function zone.

19. A non-transitory computer readable storage medium storing instructions that when executed by a computer, which includes a processor perform a method, the method comprising:
  determining a type of portable device that is connected to a vehicle;
  determining at least one positional threshold value pertaining to the type of portable device, wherein the at least one positional threshold value is associated with at least one passive function zone of the vehicle;
  determining if the portable device is located within the at least one passive function zone of the vehicle based on evaluating at least one positional threshold value pertaining to the type of portable device; and
  controlling at least one vehicle system to enable at least one passive function based on determining that the portable device is located within the at one passive function zone.

20. The non-transitory computer readable storage medium of claim 19, wherein determining the at least one positional threshold value pertaining to the type of portable device includes determining at least one subjective positional threshold value that pertains to at least one of: a make of the portable device, a model of the portable device, a version of the portable device, and a hardware chipset version of the hardware chipset of the portable device.

* * * * *